United States Patent [19]
Senba et al.

[11] Patent Number: 5,754,503
[45] Date of Patent: May 19, 1998

[54] OPTICAL DEVICE WITH IMPROVED FOCUSED ERROR DETECTION AND TRACING ERROR DETECTION FOR OPTICAL DISK DRIVE

[75] Inventors: Satoshi Senba; Shinya Hasegawa; Hiroyasu Yoshikawa; Fumihiro Tawa, all of Kawasaki, Japan

[73] Assignee: Fujitsu Limited, Kawasaki, Japan

[21] Appl. No.: 749,231

[22] Filed: Nov. 14, 1996

[30] Foreign Application Priority Data

Feb. 14, 1996 [JP] Japan .................... 8-027051
Aug. 15, 1996 [JP] Japan .................... 8-215815

[51] Int. Cl.[6] ........................................ G11B 7/00
[52] U.S. Cl. ............................ 369/44.23; 369/112
[58] Field of Search ............... 369/44.23, 44.37, 369/44.14, 44.41, 112, 116, 103, 110, 13, 109, 44.38

[56] References Cited

U.S. PATENT DOCUMENTS 5,615,200  3/1997  Hoshino .................... 369/112
5,623,462  4/1997  Tesuka et al. ............. 369/44.23
5,638,352  6/1997  Yang ........................ 369/112

*Primary Examiner*—Ali Neyzari
*Attorney, Agent, or Firm*—Armstrong, Westerman, Hattori, McLeland, & Naughton

[57] ABSTRACT

An optical device for an optical disk drive, for performing focusing error detection and tracking error detection of a laser beam converged on an optical disk. The optical device includes a diffraction grating having first, second, third, and fourth regions for diffracting a reflected beam from the optical disk in different directions. The optical device further includes a first photodetector for detecting a part of the reflected beam diffracted by the first region of the diffraction grating, a second photodetector for detecting a part of the reflected beam diffracted by the second region of the diffraction grating, a third photodetector for detecting a part of the reflected beam diffracted by the third region of the diffraction grating, and a fourth photodetector for detecting a part of the reflected beam diffracted by the fourth region of the diffraction grating. The shape and size of each of the first and second regions of the diffraction grating are optimally controlled to thereby increase a quantity of light incident on the photodetectors for focusing error detection.

23 Claims, 30 Drawing Sheets

OPTICAL DISK IS EXCESSIVELY NEAR TO OBJECTIVE LENS.

BEAM IS FOCUSED ON DISK SURFACE.

OPTICAL DISK IS EXCESSIVELY FAR FROM OBJECTIVE LENS.

OPTICAL DEVICE WITH IMPROVED FOCUSED ERROR DETECTION AND TRACING ERROR DETECTION FOR OPTICAL DISK DRIVE

BACKGROUND OF THE INVENTION

1. Field of the Invention

The present invention relates to an error detection optical device for an optical disk drive, for performing focusing error detection and tracking error detection of a laser beam converged on an optical disk.

2. Description of the Related Art

An optical disk is in the limelight as a memory medium which has become the core in the rapid development of multimedia in recent years. Usually, the optical disk is accommodated in a cartridge for actual use. The cartridge accommodating the optical disk is loaded into an optical disk drive to read/write data on the optical disk by an optical pickup (optical head).

A recording medium such as an optical disk and a magneto-optical disk is replaced by another similar recording medium in use, and these recording media have warpage or undulation due to strain in molding. As a result, such a recording medium tends to have eccentricity and inclination. Accordingly, focusing error detection and tracking error detection must be performed to read information recorded on the recording medium. Examples of a method for focusing error detection includes an astigmatic method, knife-edge method, wedge prism method, and critical angle method. Of these methods, the knife-edge method is widely used as the focusing error detection method for an optical disk drive.

A conventional error detection system employing the knife-edge method will now be described with reference to FIG. 1. A laser beam emitted from a semiconductor laser generator 2 is passed through a collimator lens 4, a beam splitter 6, a beam splitter 8, and an objective lens 10, and is then focused on an optical disk 12. A reflected beam 14 from the optical disk 12 enters the objective lens 10, by which the reflected beam 14 is converted into a collimated beam 16, which is in turn enters the beam splitter 8. The collimated beam 16 is then split into a transmitted light 18 and a servo beam 20 by the beam splitter 8.

The transmitted beam 18 is partially reflected by the beam splitter 6 to obtain a beam 19, which is then introduced into a recorded information reading system not shown. The servo beam 20 is split into a beam 24 for tracking error detection and a beam 26 for focusing error detection by a beam splitter 22. The beam 26 enters a condenser lens 28 for focusing error detection. A half of the beam 26 converged by the condenser lens 28 is cut off by a knife edge 30 interposed between the lens 28 and a photodetector 34. The other half beam 32 is focused on the photodetector 34 to form a beam spot thereon. As shown in FIGS. 2A to 2E, the photodetector 34 is divided in two parts by a division line 35 which cannot detect light. There will now be described changes of a beam spot 36 projected on the photodetector 34 with a change in distance between the objective lens 10 and the optical disk 12 with reference to FIGS. 2A to 2E.

In the knife-edge method, the position of the beam spot 36 on the photodetector 34 changes according to the distance between the optical disk 12 and the objective lens 10. Letting f34a and f34b denote the light quantities in a right-side region 34a and a left-side region 34b of the photodetector 34 divided from each other by the division line 35, a focusing error V of the laser beam on the optical disk 12 can be expressed as follows:

$$V = k(f34b - f34a) \tag{1}$$

where k is a constant.

According to this method, when the distance between the optical disk 12 and the objective lens 10 is in a range where information recorded on the optical disk 12 can be read, the beam spot 36 is formed on the division line 35 of the photodetector 34, and the size of the beam spot 36 is small as shown in FIG. 2C.

The division line 35 has a thickness of about 5 μm, and light cannot be detected on the division line 35. Accordingly, in the condition shown in FIG. 2C, the quantity of light incident on the photodetector 34 is small, so that a detection result by the photodetector 34 becomes unstable because of a disturbance such as stray light. Further, the small size of the beam spot 36 on the photodetector 34 causes problems that high accuracy is required for positioning between the semiconductor laser generator 2 and the photodetector 34 and that a range where the distance between the optical disk 12 and the objective lens 10 can be calculated from the output from the photodetector 34 becomes narrow. Therefore, the size of the beam spot 36 must be enlarged.

Referring to FIG. 3, there is shown the relation between the lens 28 and the beam spot 36 focused by the lens 28. Letting λ denote the wavelength of a beam incident on the lens 28, d denote the aperture size of the lens 28, and f denote the distance between the lens 28 and a focusing position of the beam (i.e., focal length of the lens 28), the diameter F of the beam spot 36 is expressed as follows:

$$F = k(f/d)\lambda \tag{2}$$

While the value of k depends on an intensity distribution of incident light, k=1.64 in the case that the incident light has a fixed intensity distribution. As apparent from Eq. (2), the diameter F of the beam spot 36 is determined by the focal length f of the lens 28, the aperture size d of the lens 28, and the wavelength λ of the incident beam.

Conventionally, the diameter F of the beam spot 36 is increased by increasing the focal length f of the lens 28 for converging the beam on the photodetector 34. As a result, the size of the optical pickup becomes large. Alternatively, it may be considered to increase the light quantity of the laser beam from the semiconductor laser generator 2; however, this method causes an increase in cost of the semiconductor laser generator 2.

As another prior art technique, there has been proposed an optical pickup having an error detection system configured by a single hologram as a diffraction grating instead of the beam splitter 22, the condenser lens 28, and the knife edge 30. In this optical pickup, the function of the lens 28 for converging the beam on the photodetector 34 shown in FIG. 1 is obtained by the collimator lens 4. Accordingly, to change the distance between the hologram and the photodetector, the focal length of the collimator lens must be changed. However, when the distance between the semiconductor laser generator and the collimator lens is increased, a coupling efficiency of the beam is reduced to cause a decrease in total light quantity of beams diffracted toward the photodetector by the hologram.

Accordingly, in the error detection system employing the hologram, the diameter of a beam spot to be focused on the photodetector must be enlarged without an increase in focal length of the condenser lens or the collimator lens.

SUMMARY OF THE INVENTION

It is therefore an object of the present invention to provide an error detection optical device for an optical disk drive which can perform accurate detection of focusing error by controlling the shape of a beam spot formed on a photodetector for error detection by the use of a diffraction grating to thereby increase a quantity of light incident on the photodetector.

In accordance with an aspect of the present invention, there is provided an optical device for an optical disk drive, for performing focusing error detection and tracking error detection of a laser beam converged on an optical disk, comprising a diffraction grating having first, second, third, and fourth regions for diffracting a reflected beam from the optical disk in different directions; a first photodetector having a first separation line, for detecting a part of the reflected beam diffracted by the first region of the diffraction grating; a second photodetector having a second separation line, for detecting a part of the reflected beam diffracted by the second region of the diffraction grating; a third photodetector for detecting a part of the reflected beam diffracted by the third region of the diffraction grating; and a fourth photodetector for detecting a part of the reflected beam diffracted by the fourth region of the diffraction grating; the third and fourth regions being divided from each other by a straight division line extending parallel to an information recording direction of the optical disk and passing through a center of the diffraction grating; the first and second regions being located in symmetry with respect to a reference line perpendicularly intersecting the straight division line and passing through the center of the diffraction grating, and being spaced from the reference line; each of the first and second regions being surrounded by first and second straight lines spaced from each other in parallel relationship to the straight division line and third and fourth straight lines spaced from each other in perpendicular relationship to the straight division line.

Alternatively, each of the first and second regions may be surrounded by first and second straight lines spaced from each other in parallel relationship to the straight division line, a third straight line perpendicular to the straight division line, and a curved line. Preferably, the curved line corresponds to a part of an outer circumference of the diffraction grating.

In accordance with another aspect of the present invention, there is provided an optical device for an optical disk drive, for performing focusing error detection and tracking error detection of a laser beam converged on an optical disk, comprising a diffraction grating having first, second, third, fourth, fifth, and sixth regions for diffracting a reflected beam from the optical disk in different directions; a first photodetector having a first separation line, for detecting a part of the reflected beam diffracted by the first region of the diffraction grating; a second photodetector having a second separation line, for detecting a part of the reflected beam diffracted by the second region of the diffraction grating; a third photodetector for detecting a part of the reflected beam diffracted by the third region of the diffraction grating; a fourth photodetector for detecting a part of the reflected beam diffracted by the fourth region of the diffraction grating; a fifth photodetector for detecting a part of the reflected beam diffracted by the fifth region of the diffraction grating; and a sixth photodetector for detecting a part of the reflected beam diffracted by the sixth region of the diffraction grating; the third, fourth, fifth, and sixth regions being divided from each other by a first straight division line extending parallel to an information recording direction of the optical disk and passing through a center of the diffraction grating, and by a second straight division line perpendicularly intersecting the first division line and passing through the center of the diffraction grating; the first and second regions being located in symmetry with respect to the second straight line and spaced apart from the second straight line; each of the first and second regions being surrounded by first and second straight lines spaced from each other in parallel relationship to the first straight division line and third and second straight lines spaced from each other in parallel relationship to the second straight division line.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
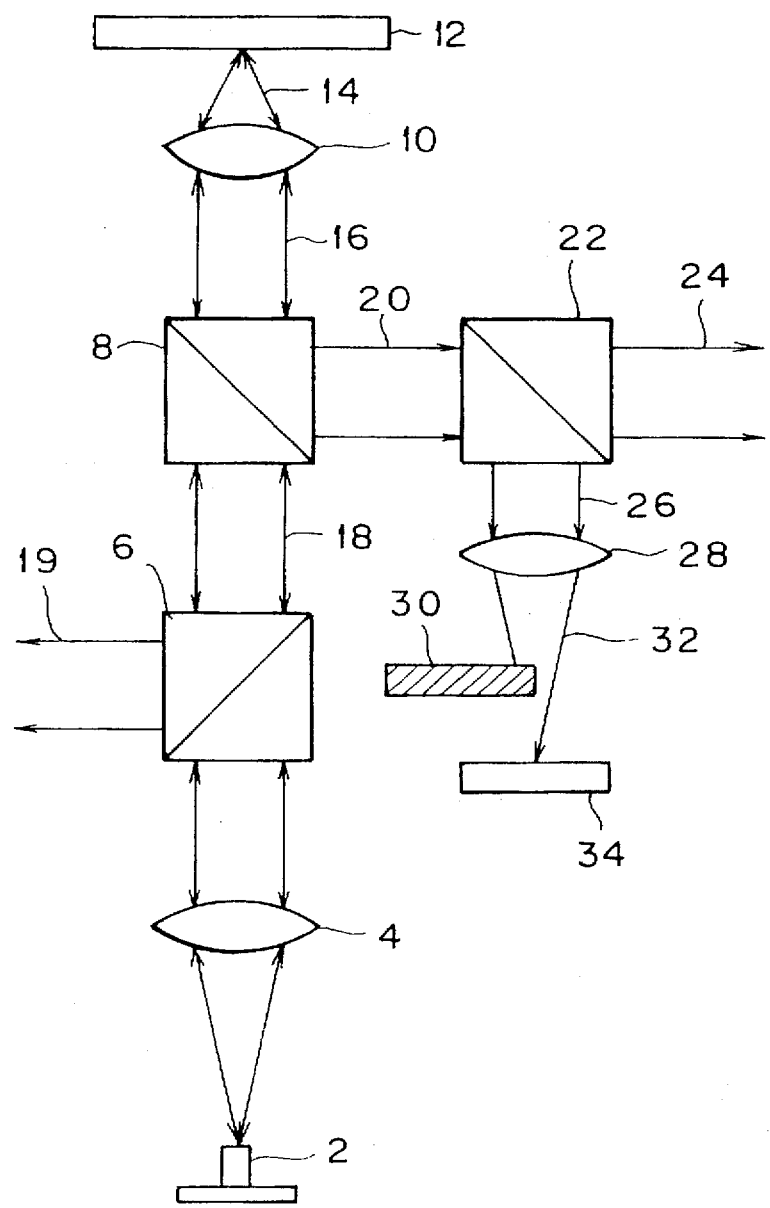
FIG. 1 is a view showing a general configuration of a conventional optical pickup.
Figure 2A:
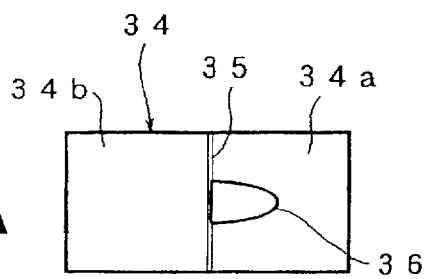
FIGS. 2A to 2E are views showing changes of a beam spot on a photodetector.
Figure 2B:
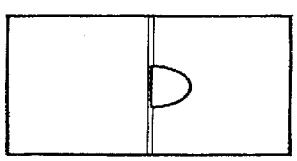
Figure 2C:
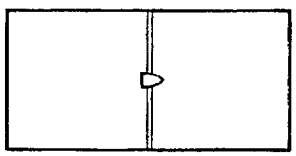
Figure 2D:
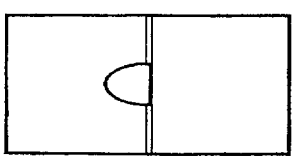
Figure 2E:
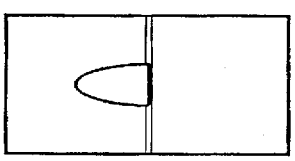
Figure 3:
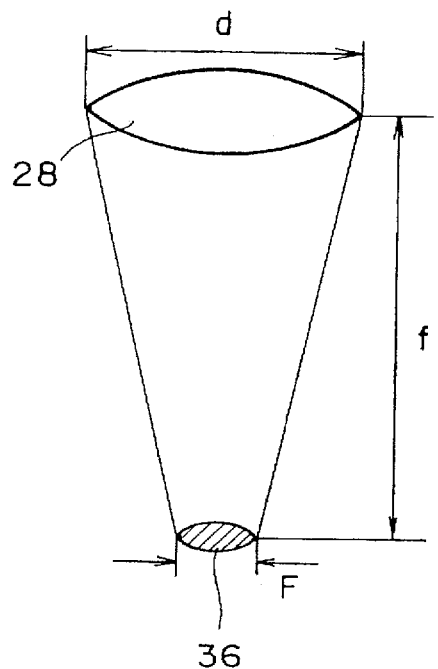
FIG. 3 is a view showing the relation between a lens and a beam spot.
Figure 4:
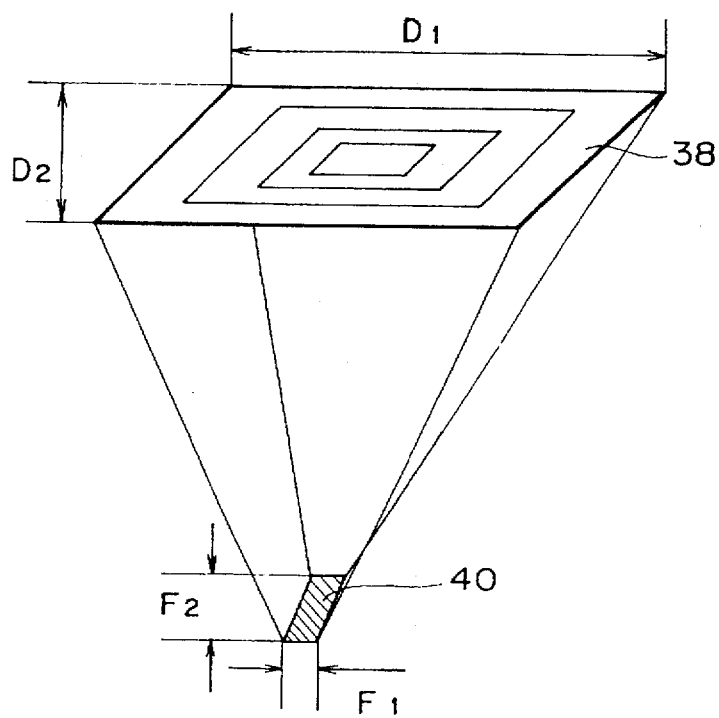
FIG. 4 is a view showing the relation between a rectangular diffraction grating and a beam spot.

Prior to description of the preferred embodiments of the present invention, there will be described the principle of the present invention employing a hologram as a diffraction grating with reference to FIGS. 4 to 8. FIG. 4 shows the relation between a rectangular hologram 38 as a diffraction grating whose different two sides have lengths of D1 and D2 and a rectangular beam spot 40 whose different two sides have lengths of F1 and F2, obtained from a beam converged by the hologram 38.

The principle of convergence of the beam by the hologram 38 is the same as that by an optical lens, so that the size of the beam spot 40 is determined by the wavelength $\lambda$ of the beam and the focal length and aperture size of the diffraction grating 38. The size of the diffraction grating 38 is represented by the lengths D1 and D2 of the two sides of the diffraction grating 38, provided that the direction of the side having the length D1 is perpendicular to the division line 35 of the photodetector 34.

As apparent from Eq. (2), the larger the aperture size, the smaller the diameter of a beam spot. Therefore, the larger the length D1 of one side of the diffraction grating 38, the smaller the length F1 of one side of the beam spot 40, and the larger the length D2 of one side of the diffraction grating 38, the smaller the length F2 of one side of the beam spot 40. Accordingly, the size and shape of the beam spot 40 can be controlled by changing the lengths D1 and D2 of the two sides of the diffraction grating 38. Further, the total light quantity of the beam is equal to a quantity of light incident on the diffraction grating 38. Therefore, if a value of D1×D2 is constant under the condition that a beam having a uniform distribution of light quantities is incident on the diffraction grating 38, the total light quantity of the beam becomes constant irrespective of values of D1 and D2.

Figure 5A:
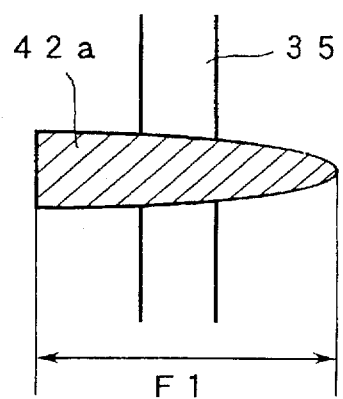
FIGS. 5A to 5C are views showing changes in shape of a beam spot with a change in D1.
Figure 5B:
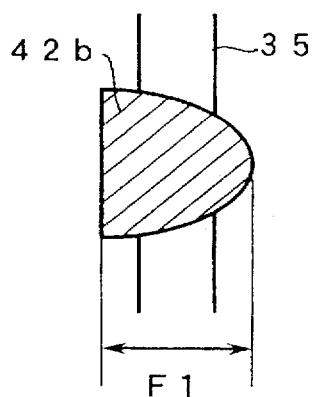
Figure 5C:
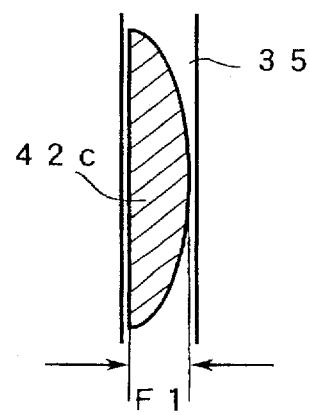

FIGS. 5A to 5C show shapes 42a to 42c of beam spots converged on the photodetector in the case that the value of D1 is changed under the condition that the value of D1×D2 is constant. Reference numeral 35 denotes a division line of the photodetector. As apparent from the comparison between FIG. 5A and FIG. 5C, there is a difference in quantity of light incident on a light detecting portion of the photodetector 34 according to the length F1 even when the incident beam is directed from the same area of the diffraction grating 38. The smaller the length D1 of the diffraction grating 38, the larger the length F1. Accordingly, by increasing the length F1, an increased quantity of light can be directed onto the light detecting portion of the photodetector 34.

Figure 6:
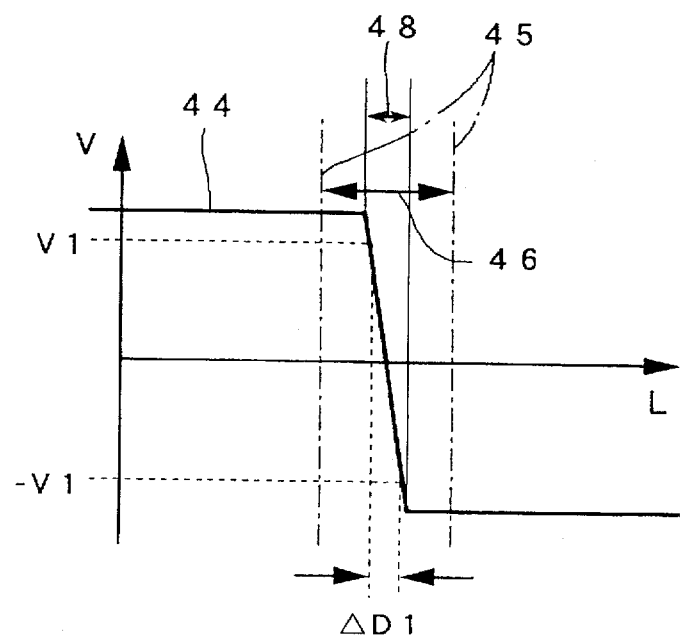
FIG. 6 is a graph showing the relation between a distance L between an objective lens and an optical disk and an output V from a photodetector when D1 is large.
Figure 7:
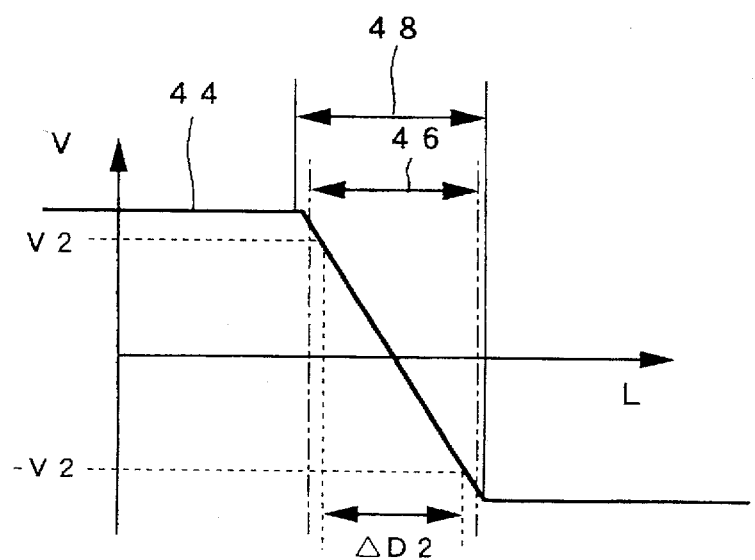
FIG. 7 is a graph similar to FIG. 6, when D1 is medium.
Figure 8:
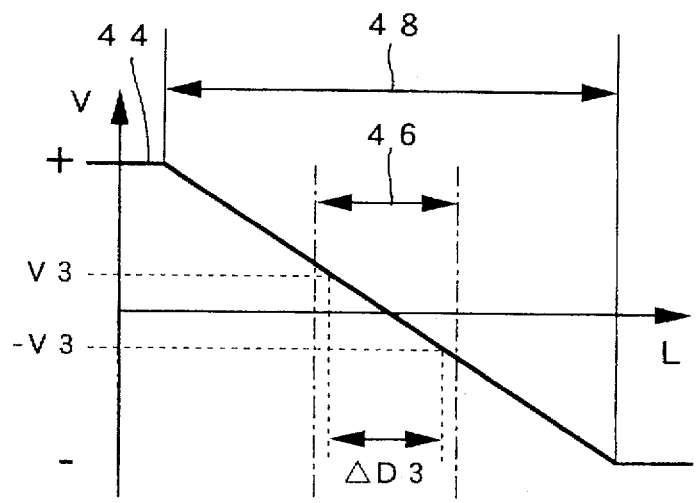
FIG. 8 is a graph similar to FIG. 6, when D1 is small.

FIGS. 6 to 8 show the relation between the distance L between the objective lens and the optical disk and the focusing error V shown in Eq. (1) when the value of D1 is changed under the condition that the value of D1×D2 is constant. In each of FIGS. 6 to 8, a bold line 44 denotes a value of V, and a region 46 defined between two phantom lines 45 denotes a range of L (corresponding to the distance between the head and the disk) in which information recorded on the recording medium can be read. A region 48 where the value of V changes denotes a dynamic range.

The focusing error detection is effected by calculating L from V and next carrying out a correction operation on the basis of a calculated value of L. Therefore, the correction operation cannot be carried out in any ranges other than the dynamic range 48. In FIGS. 6 to 8, V1 to V3 denote threshold voltages at starting the correction operation, and ΔD1 to ΔD3 denote ranges of assumable values of L when information is in a readable condition.

As shown in FIG. 6, the gradient of the output V 44 is steep, and the range ΔD1 is narrower than the information readable range 46. Accordingly, with a slight change in L, the value of V exceeds the threshold voltage V1 (−V1). As a result, the focusing error correction operation occurs frequently, and a correctable range of L is also narrowed. In addition, a drive mechanism for driving the objective lens does not sufficiently follow the correction operation, causing failures in the correction operation.

Conversely in the case shown in FIG. 8, the range ΔD3 can be set to a wide range near to the information readable range 46. However, since the gradient of the output V 44 is gentle because dynamic range 48 is wide, the range between −V3 and V3 becomes narrow with respect to the range ΔD3. Accordingly, the threshold voltage V3 (−V3) must be set to a small value. However, setting the threshold voltage V3 to a small value causes a problem that the output from the photodetector easily exceeds the threshold value because of mixing of a circuit noise into the result of detection by the photodetector, thus resulting in an increase in error of the detection result.

It is understood from the above discussion that the length F1 of one side of the beam spot 40 cannot be limitlessly enlarged. A beam spot having the best size is obtained in the case that the dynamic range 48 is substantially equal to the information readable range 46 as shown in FIG. 7. That is, the value of D1 must be reduced to some extent to increase the length F1 perpendicular to the division line of the beam spot 40. However, the value of D1 cannot be limitlessly reduced because a high immunity to circuit noise must be ensured, so that the value of D1 is limited to fall in a given range.

Thus, the value of D1 is decided from a lower limit of quantity of light incident on the light detecting portion of the photodetector and from the immunity to noise in an electronic circuit. After decision of D1, the value of D2 that can ensure a necessary light quantity for the focusing error correction is decided. Further, the wavelength λ of the laser beam and the focal length F of the collimator lens are decided from a limitation of the optical disk drive.

By using a hologram as a diffraction grating with the above conditions, it is possible to provide an error detection optical device for an optical disk drive which can enlarge a beam spot to be projected on the photodetector even when a beam is focused on the optical disk, and has a high immunity to circuit noise. While the rectangular hologram as a diffraction grating has been used in the above description, any hologram having an arbitrary shape may be used in the present invention.

Now, the tracking error detection will be described. Examples of a tracking error detection method include a push-pull method and a heterodyne method. The push-pull method is a tracking error detection method utilizing the fact that a distribution of reflected light from an optical disk changes according to a positional relation between a beam spot of a laser beam converged on the optical disk by an objective lens and a guide groove on the optical disk.

When the center of the beam spot lies on the center line of the guide groove, the distribution of the reflected light becomes uniform, whereas when the center of the beam spot shifts from the center line of the guide groove, the distribution of the reflected light becomes nonuniform, so that the reflected light comes off the center line of the guide groove to the right or left side thereof. Accordingly, when the reflected light enters a hologram capable of bisecting the reflected beam along a line parallel to an information recording direction of the optical disk in the case that the center of the beam spot lies on the center line of the guide groove, the reflected light is divided into two equal beams, which are in turn incident on different photodetectors A and B. In this case, letting fa and fb denote the outputs from the photodetectors A and B, a tracking error signal TES is expressed as follows:

$$TES = fa - fb$$

Accordingly, the tracking error detection can be performed according to a value of TES. When the depth of the guide groove on the optical disk is λ/8 where λ is the wavelength of the laser beam incident on the optical disk, a change in distribution of reflected light due to fluctuations in focusing position becomes maximum. However, when the depth of the guide groove is λ/4, a distribution of change in reflected light due to fluctuations in focusing position disappears. Further, when an objective lens is moved to correct the focusing position, causing a difference between the center of diffracted light and the center of the diffraction grating, there occurs an offset in the output TES.

On the other hand, in comparison with the push-pull method by dividing a reflected beam into two equal parts, the heterodyne method is a tracking error detection method by dividing a reflected beam into four equal parts to measure an intensity distribution of the reflected beam. Differing from the push-pull method, the heterodyne method can correct the focusing position of the reflected beam even when the depth of the guide groove is λ/4. Although the heterodyne method has an advantage that the output offset due to movement of the objective lens hardly occurs, a complicated electronic circuit is required to correct the focusing position of the beam from the output from the photodetector.

Figure 9:
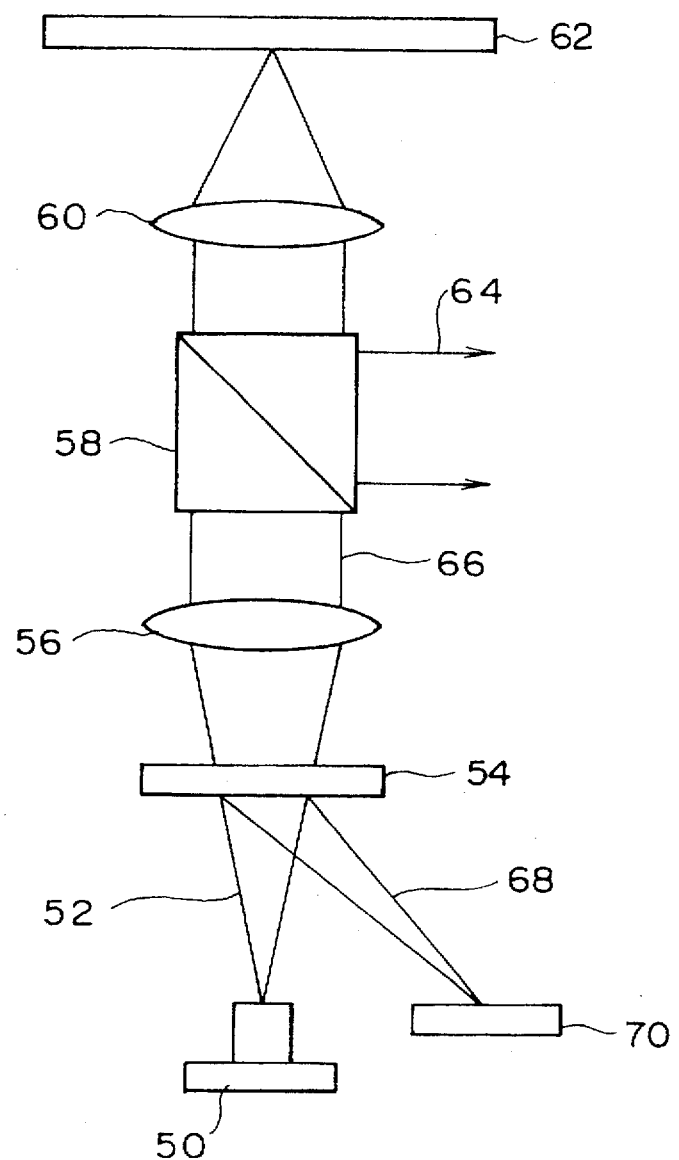
FIG. 9 is a view showing a general configuration of an optical pickup including the error detection optical device of the present invention.

Referring to FIG. 9, there is shown a general configuration of an optical pickup including the error detection device of the present invention. A laser beam 52 emitted from a semiconductor laser generator 50 is transmitted by a hologram 54 as a diffraction grating having some different diffraction directions, and next enters a collimator lens 56, by which the laser beam 52 is converted into a collimated beam. The collimated beam is transmitted by a beam splitter 58 to enter an objective lens 60, by which the collimated beam is focused on an optical disk 62.

A reflected beam from the optical disk 62 is converted into a collimated beam by the objective lens 60 to enter the beam splitter 58, by which the collimated beam is split into a reflected beam 64 and a transmitted beam 66. The reflected beam 64 is introduced into an information reading system not shown. The transmitted beam 66 enters the collimator lens 56, and converged by the collimator lens 56 to enter the hologram 54, by which the transmitted beam 66 is diffracted in four different directions. Resultant four diffracted beams 68 from the hologram 54 are converged near the surface of a photodetector unit 70 including four photodetectors to form four beam spots on the surfaces of the four photodetectors.

Figure 10:
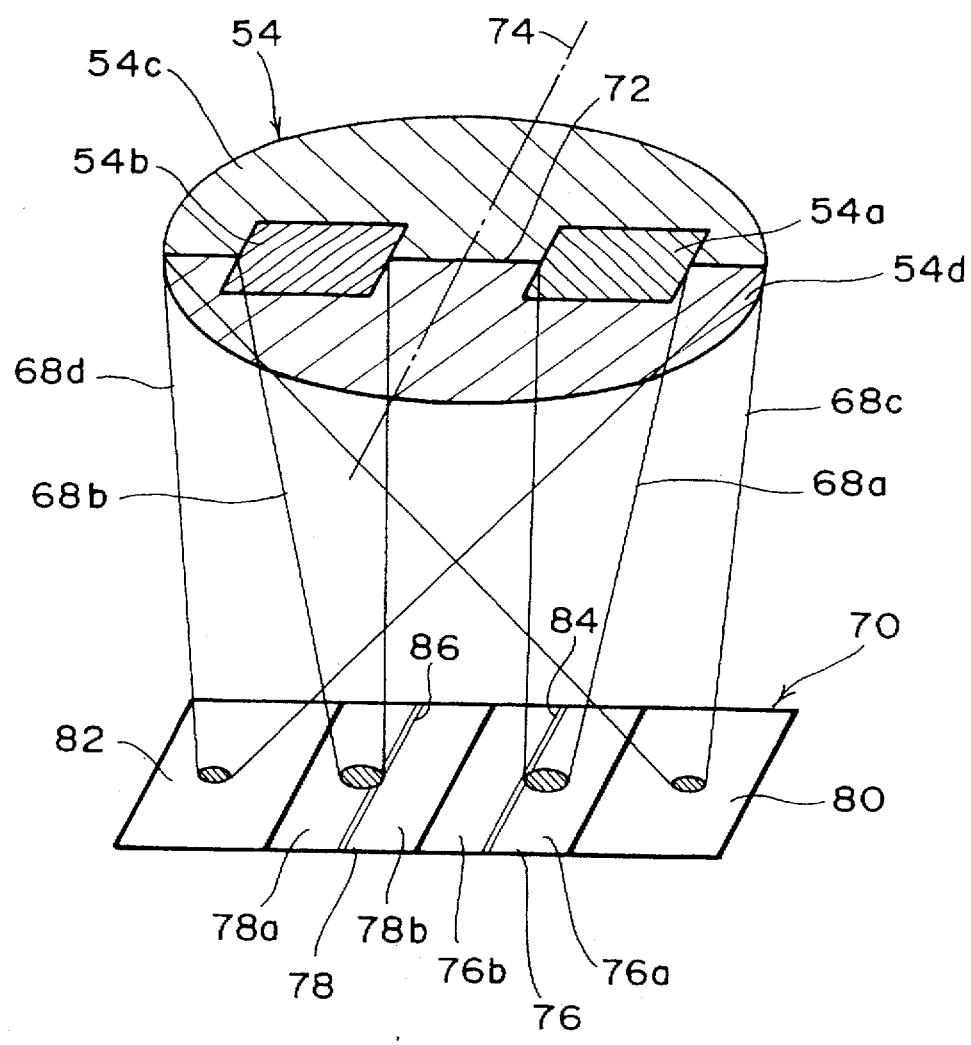
FIG. 10 is a perspective view of a first preferred embodiment of the present invention.

Referring to FIG. 10, there is shown an enlarged perspective view of the hologram 54 and the photodetector unit 70 according to a first preferred embodiment of the present invention. The hologram 54 is composed of four divided regions, i.e., a first region 54a, a second region 54b, a third regions 54c, and a fourth region 54d. A beam incident on the hologram 54 is diffracted in four different directions by the first to fourth regions 54a to 54d.

Figure 34:
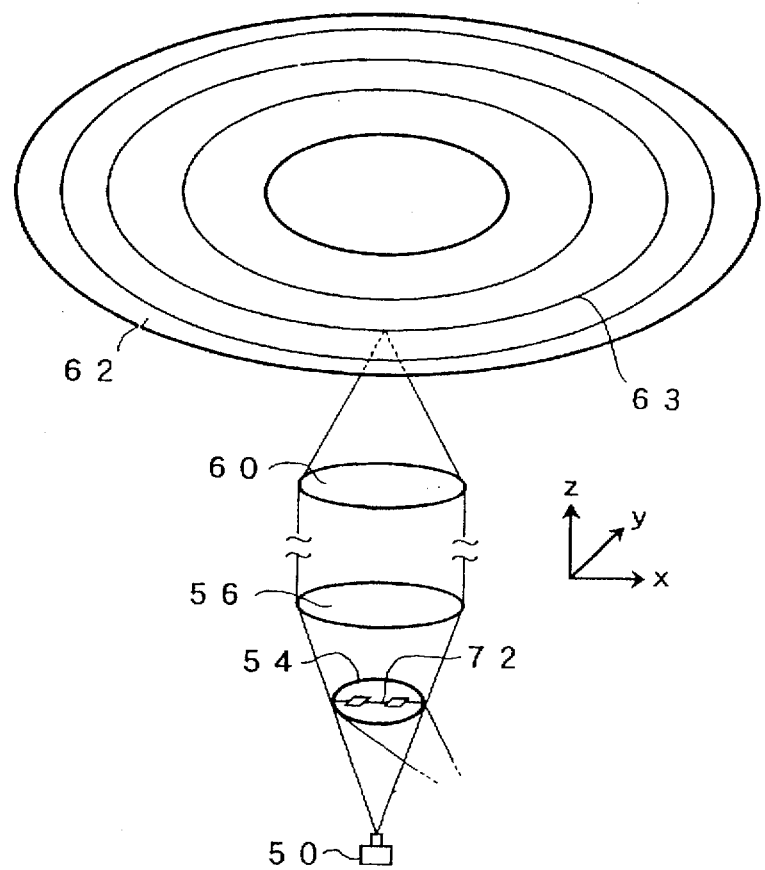
FIG. 34 is a view showing the relation between an information recording direction of an optical disk and a division line of a hologram.

Diffracted beams 68c and 68d from the third region 54c and the fourth region 54d are used for tracking error detection. A division line 72 dividing the third region 54c from the fourth region 54d extends parallel to an information recording direction of an optical disk and passes through the center of the hologram 54. The relation between the information recording direction of the optical disk 62 and the division line 72 of the hologram 54 is shown in FIG. 34. As apparent from FIG. 34, the division line 72 of the hologram 54 extends parallel to the direction of a track 63 on the optical disk 62.

On the other hand, diffracted beams 68a and 68b from the first region 54a and the second region 54b are used for focusing error detection. The first region 54a and the second region 54b are symmetrical with respect to a reference line 74 perpendicular to the division line 72 and passing through the center of the hologram 54, and are located apart from the reference line 74. Each of the first and second regions 54a and 54b is surrounded by two straight lines spaced from each other in parallel relationship to the division line 72 and two straight lines spaced from each other in parallel relationship to the reference line 74. In other words, the first and second regions 54a and 54b are rectangular and located in symmetry with reference to the reference line 74.

The photodetector unit 70 includes two photodetectors 76 and 78 for focusing error detection and two photodetectors 80 and 82 for tracking error detection. The photodetector 76 is composed of two regions 76a and 76b divided by a division line 84. Similarly, the photodetector 78 is composed of two regions 78a and 78b divided by a division line 86.

The tracking error detection will first be described. The beam 68c diffracted by the third region 54c of the hologram 54 is converged on the photodetector 80, and the beam 68d diffracted by the fourth region 54d is converged on the photodetector 82. The division line 72 dividing the third region 54c from the fourth region 54d extends parallel to the information recording direction of the optical disk. Accordingly, letting f80 and f82 denote the quantities of light incident on the photodetectors 80 and 82, respectively, a deviation between the focusing position of an incident beam on the optical disk and the track on the optical disk, i.e., a tracking error signal (TES) by a push-pull method can be expressed as follows:

TES=f80−f82

The focusing error detection will now be described. In this preferred embodiment, the first and second regions 54a and 54b of the hologram 54 are used to perform the focusing error detection. The beam 68a diffracted by the first region 54a is converged on the photodetector 76, and the beam 68b diffracted by the second region 54b is converged on the photodetector 78. As mentioned above, each of the photodetectors 76 and 78 is divided into two regions by each of the division lines 84 and 86 perpendicular to a direction of movement of the beam spots due to a change in distance between the objective lens and the optical disk.

Letting f76a, f76b, f78a, and f78b denote the quantities of light incident on the regions 76a, 76b, 78a, and 78b, respectively, a focusing error signal (FES) can be expressed as follows:

FES=(f76a−f76b)+(f78a−f78b)

Ideally, FES becomes zero, which gives a focused condition.

Figure 11A:
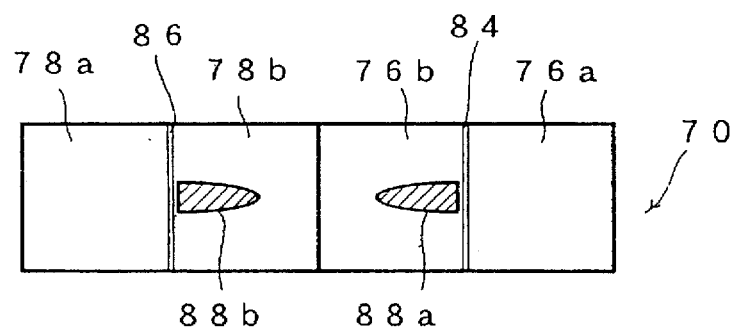
FIGS. 11A to 11C are views showing changes of beam spots on photodetectors with a change in focusing position of a laser beam on an optical disk.
Figure 11B:
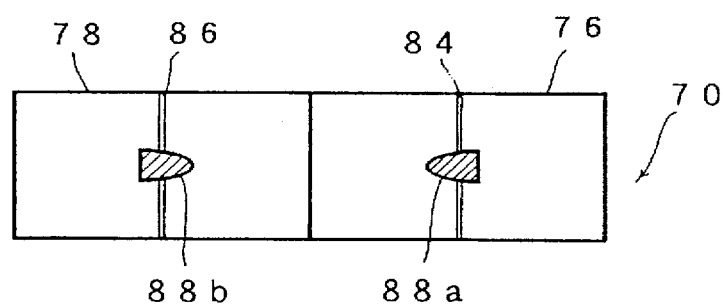
Figure 11C:
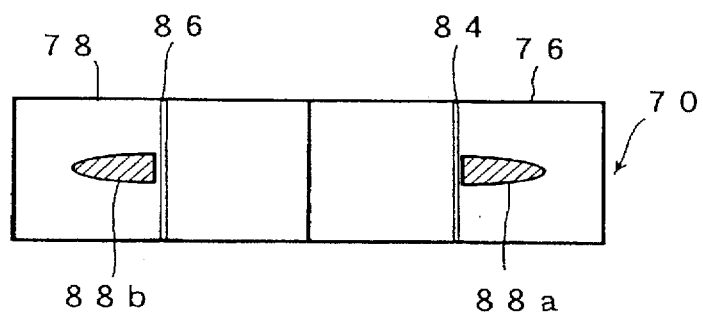

Referring to FIGS. 11A to 11C, there are shown changes in beam spots on the photodetector 70 when the distance between the optical disk and the objective lens is changed. FIG. 11B shows a condition when the laser beam is focused on the optical disk. In this case, a beam spot 88a is formed on the photodetector 76 so as to overlap the division line 84, and a beam spot 88b is similarly formed on the photodetector 78 so as to overlap the division line 86.

FIG. 11A shows a condition of the beam spots on the photodetectors 76 and 78 in the case that the distance between the optical disk and the objective lens is larger than that in the condition shown in FIG. 11B. FIG. 11C shows a condition of the beam spots on the photodetectors 76 and 78 in the case that the distance between the optical disk and the objective lens is shorter than that in the condition shown in FIG. 11B.

Figure 12:
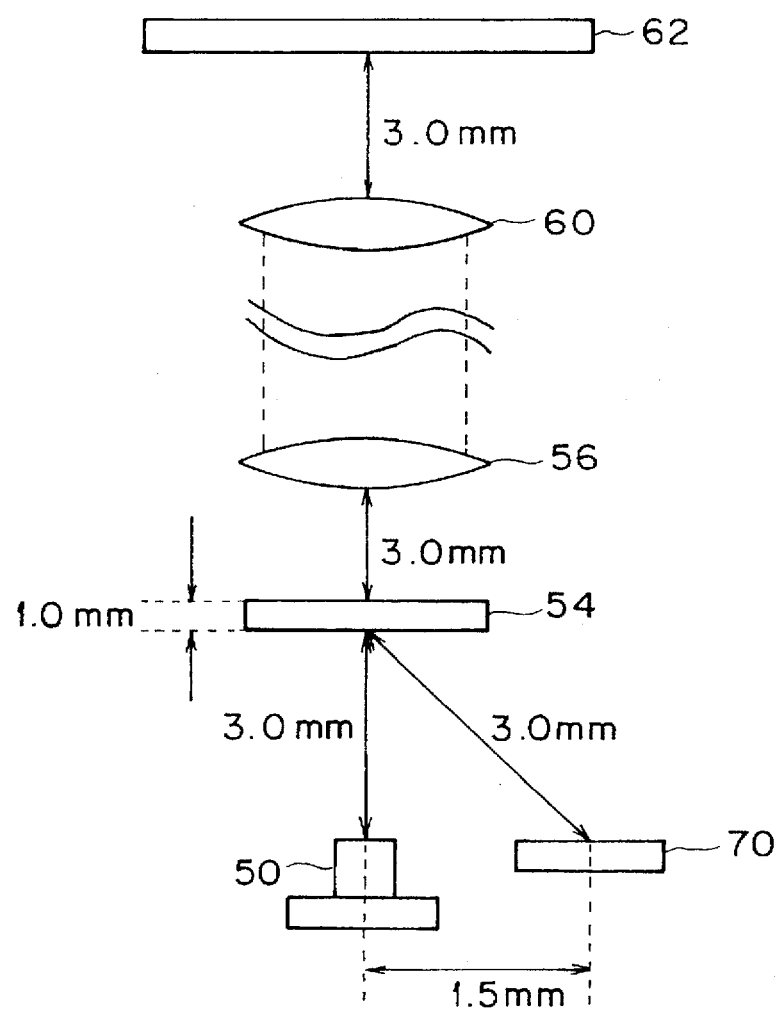
FIG. 12 is a view showing an example of dimensions in the optical pickup shown in FIG. 9.

FIG. 12 shows an example of actual dimensions in the optical pickup shown in FIG. 9. In this preferred embodiment, it is assumed that the wavelength of the laser beam emitted from the semiconductor laser generator 50 is 680 nm and that information recorded on the optical disk 62 can be read in a variation range of ±9.0 μm about an ideal value of the distance between the optical disk 62 and the objective lens 60. Further, it is assumed that a ratio in area between the photodetectors for detecting TES and FES is set to 5.4:1 from a limitation of light quantity and that this ratio cannot be changed.

Figure 13:
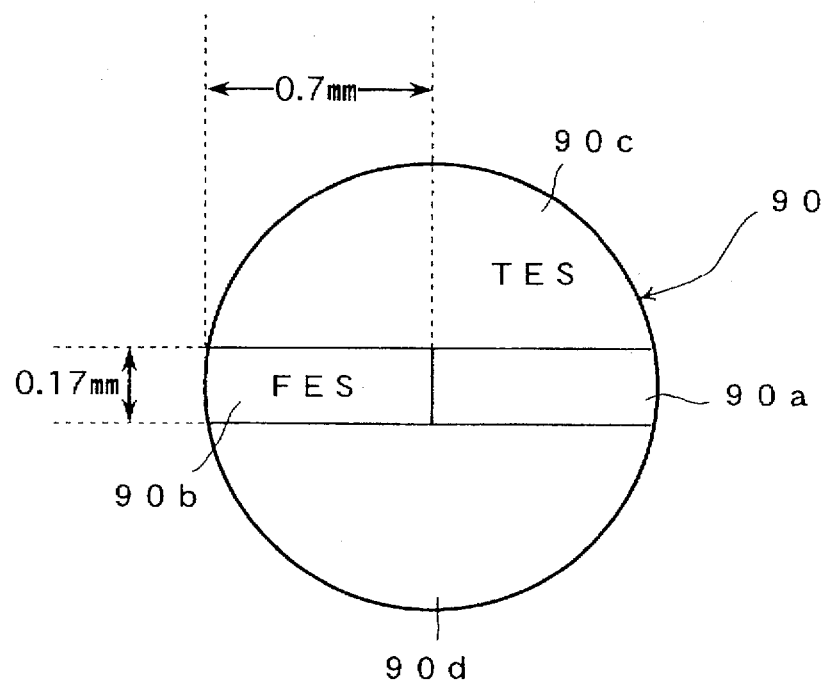
FIG. 13 is a view showing a distribution of interference fringes on a hologram.
Figure 15:
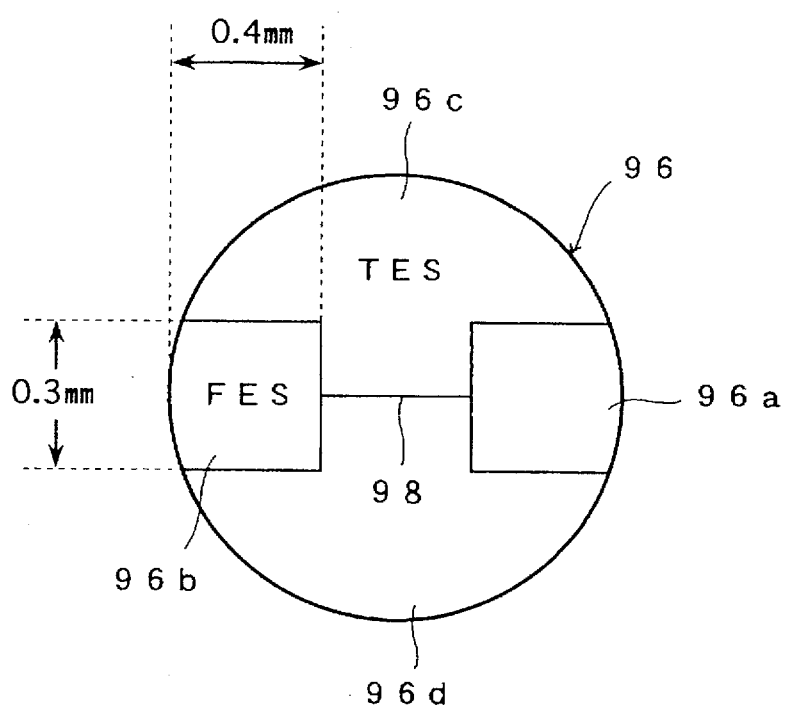
FIG. 15 is a view showing a distribution of interference fringes on a hologram according to a second preferred embodiment of the present invention.
Figure 17:
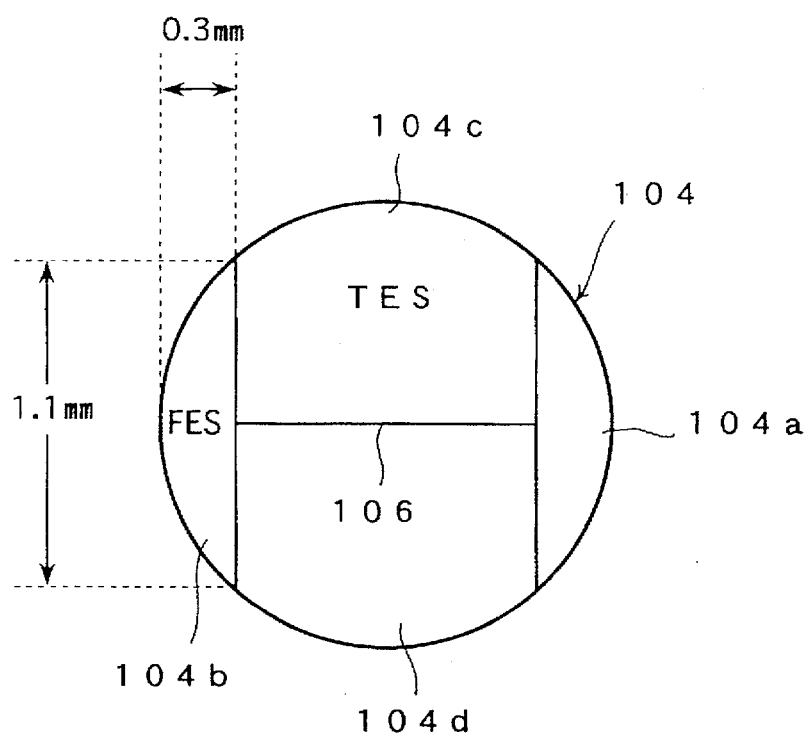
FIG. 17 is a view showing a distribution of interference fringes on another hologram.

Holograms 90, 96, and 104 as diffraction gratings having distributions of interference fringes as respectively shown in FIGS. 13, 15, and 17 were prepared. The hologram 90 shown in FIG. 13 is composed of two regions 90a and 90b for FES beam detection and two regions 90c and 90d for TES beam detection. FIG. 15 shows a distribution of interference fringes of the hologram 96 according to a second preferred embodiment of the present invention. In the second preferred embodiment shown in FIG. 15, two regions 96c and 96d for detecting TES beams are divided from each other by a division line 98 passing through the center of the hologram 96 and extending parallel to the information recording direction of the optical disk.

Two regions 96a and 96b for detecting FES beams are located in symmetry with respect to a reference line passing through the center of the hologram 96 and extending perpendicular to the division line 98. Each of the regions 96a and 96b is surrounded by two straight lines parallel to the division line 98, one straight line perpendicular to the division line 98, and a curved line coinciding with a part of the outer circumference of the circular hologram 96.

The hologram 104 shown in FIG. 17 is composed of two regions 104a and 104b for FES beam detection and two regions 104c and 104d for TES beam detection. The regions 104c and 104d are divided from each other by a division line 106 passing through the center of the hologram 104 and extending parallel to the information recording direction of the optical disk.

In the holograms 90, 96, and 104 respectively shown in FIGS. 13, 15, and 17, the ratio in area between the regions for FES beam detection and the regions for TES beam detection is constant so as to be set to 1:5.4 as mentioned above. Accordingly, the total quantity of light incident on the photodetectors 76, 78, 80, and 82 of the photodetector unit 70 shown in FIG. 10 is constant even though any of the holograms 90, 96, and 104 is adopted.

Figure 14A:
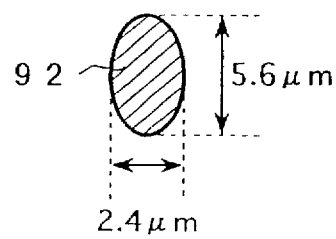
FIGS. 14A and 14B are views showing a beam spot of a TES beam and a beam spot of a FES beam, respectively, when the hologram shown in FIG. 13 is used.
Figure 14B:
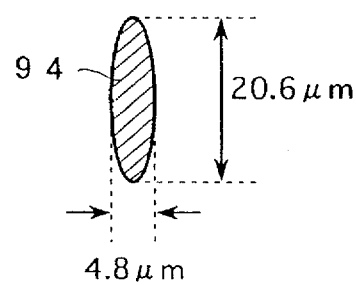
Figure 16A:
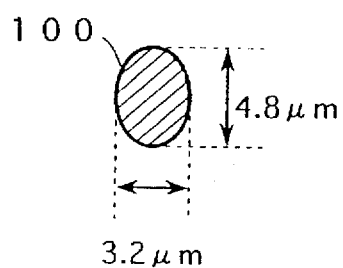
FIGS. 16A and 16B are views showing a beam spot of a TES beam and a beam spot of a FES beam, respectively, when the hologram shown in FIG. 15 is used.
Figure 16B:
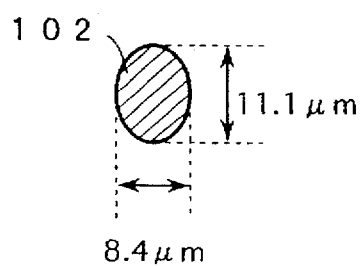
Figure 18A:
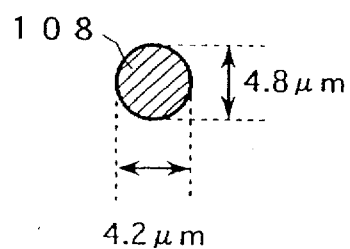
FIGS. 18A and 18B are views showing a beam spot of a TES beam and a beam spot of a FES beam, respectively, when the hologram shown in FIG. 17 is used.
Figure 18B:
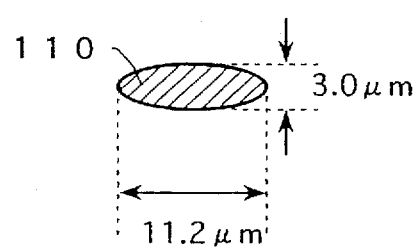

FIGS. 14A and 14B show a beam spot 92 of a TES beam and a beam spot 94 of a FES beam, respectively, in the case that the hologram 90 shown in FIG. 13 is used. Similarly, FIGS. 16A and 16B show a beam spot 100 of a TES beam and a beam spot 102 of a FES beam, respectively, in the case that the hologram 96 shown in FIG. 15 is used. Although the beam spots 100 and 102 are different in size, but similar to each other in shape. Similarly, FIGS. 18A and 18B show a beam spot 108 of a TES beam and a beam spot 110 of a FES beam, respectively, in the case that the hologram 104 shown in FIG. 17 is used.

A variation ΔL in the distance between the objective lens 60 and the optical disk 62 is related with a displacement ΔM of the center of the beam spot on each photodetector for FES beam detection by the following equation.

$$\Delta M = \pm \Delta L \cdot L_1 / (L_2 + L_3 + L_4) \qquad (3)$$

where $L_1$ is the distance between the objective lens 60 and the optical disk 62, $L_2$ is the distance between the hologram 54 and the collimator lens 56, $L_3$ is the thickness of the hologram 54, and $L_4$ is the distance between the hologram 54 and the photodetector unit 70. From the dimensions shown in FIG. 12 and Eq. (3), it is apparent that when the variation ΔL is ±9.0 μm, the displacement ΔM of the center of the beam spot becomes ±3.86 μm.

In this preferred embodiment, the division lines 84 and 86 extend perpendicular to a direction of movement of the beam spots. Letting BL denote the length of each beam spot in the direction of movement thereof, the length DL of the dynamic range 48 shown in FIGS. 6 to 8 is obtained by the following equation.

$$DL = \pm|\Delta L| + BL/2 - |\Delta M| \quad (4)$$

By using Eq. (4), the dynamic ranges of the holograms 90, 96, and 104 shown in FIGS. 13, 15, and 17 are calculated to ±6.2 μm, ±10.9 μm, and ±14.5 μm, respectively.

As shown in FIG. 7, the best condition is provided when the dynamic range 46 is substantially equal to the variation ΔL in the distance between the objective lens 60 and the optical disk 62 where information recorded on the optical disk 62 can be read. Therefore, by comparing above each value of the dynamic range and ΔL =±9.0μm, it is understood that the focusing error detection can be optimized when the hologram 96 shown in FIG. 15 is used. In this case, as shown in FIGS. 16A and 16B, the beam spot 100 of the TES beam and the beam spot 102 of the FES beam have substantially the same shape.

Figure 19:
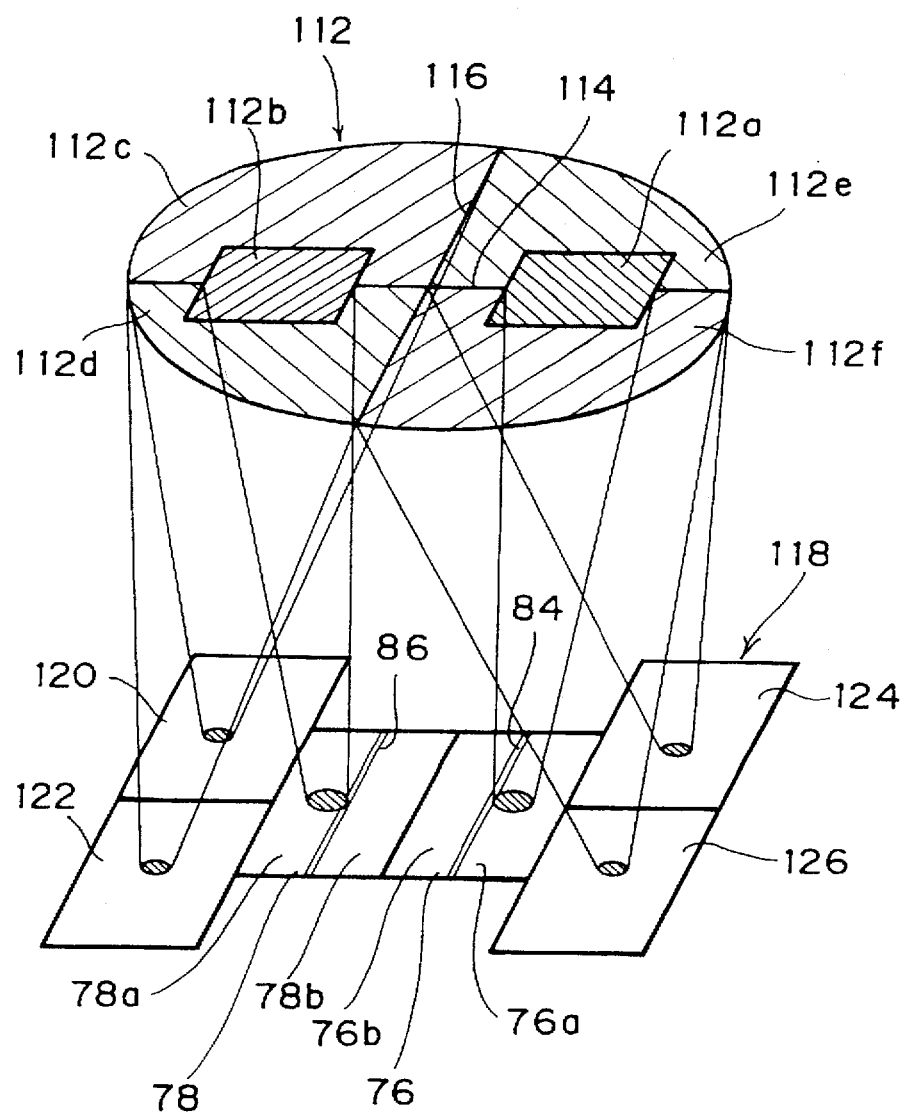
FIG. 19 is a perspective view of a third preferred embodiment of the present invention.

Referring to FIG. 19, there is shown a perspective view of a hologram 112 as a diffraction grating and a photodetector unit 118 according to a third preferred embodiment of the present invention. This preferred embodiment is similar to the first and second preferred embodiments in the point of focusing error detection, but different from the first and second preferred embodiments in the point that the third preferred embodiment employs a heterodyne method for tracking error detection.

A magneto-optical disk drive for reading/writing information on a magneto-optical disk employs a semiconductor laser generating a laser beam having a wavelength shorter than that in an optical disk drive for reading information on a CD-ROM, because the magneto-optical disk is higher in density than the CD-ROM. Accordingly, in the case of using the magneto-optical disk drive also for the purpose of reading the CD-ROM, a laser beam having a shorter wavelength must be used. However, in directing the laser beam for the magneto-optical disk drive onto a guide groove of the CD-ROM, a tracking error signal allowing a push-pull method cannot be obtained. Therefore, a heterodyne method must be used in this case.

The hologram 112 is composed of six divided regions 112a, 112b, 112c, 112d, 112e, and 112f. The regions 112a and 112b are used for FES beam detection, and the regions 112c to 112f are used for TES beam detection. The photodetector unit 118 includes two photodetectors 76 and 78 for FES beam detection like those in the first preferred embodiment shown in FIG. 10, and focusing error detection is similar to that in the first preferred embodiment shown in FIG. 10, so the description thereof will be omitted herein.

The photodetector unit 118 further includes four photodetectors 120, 122, 124, and 126 for TES beam detection. Beams diffracted by the regions 112c, 112d, 112e, and 112f of the hologram 112 are incident on the photodetectors 120, 122, 124, and 126, respectively. The four regions 112c to 112f are divided from each other by a first division line 114 passing through the center of the hologram 112 and extending parallel to the information recording direction of the optical disk, and by a second division line 116 perpendicular to the first division line 114 and passing through the center of the hologram 112.

Letting f120, f122, f124, and f126 denote the outputs from the photodetectors 120, 122, 124, and 126, respectively, a deviation TES between the focusing position of a beam directed on the optical disk and the track on the optical disk can be expressed as follows:

TES=f120+f126−(f122+f124)

Figure 20:
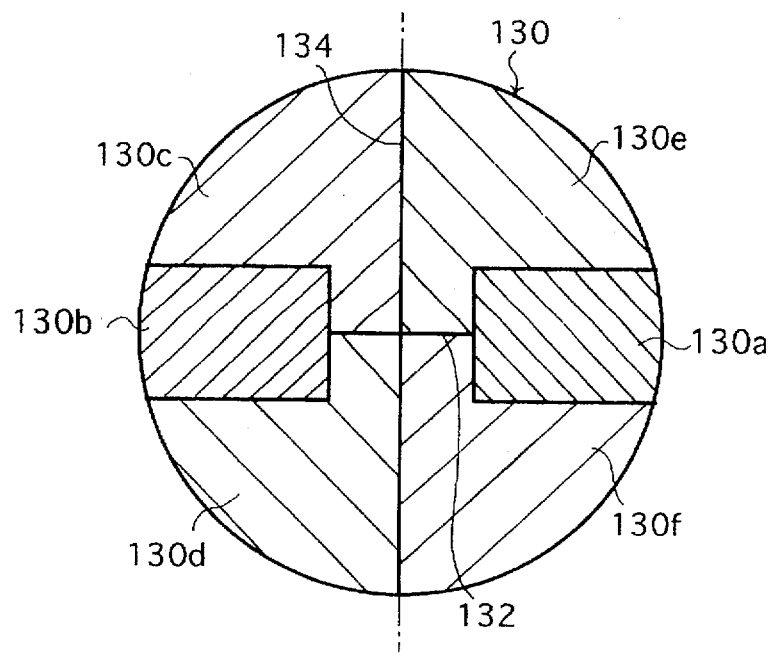
FIG. 20 is a view showing a distribution of interference fringes on a hologram according to a fourth preferred embodiment of the present invention.

Referring to FIG. 20, there is shown a hologram 130 as a diffraction grating according to a fourth preferred embodiment of the present invention. Like the third preferred embodiment shown in FIG. 19, the hologram 130 is used in combination with the photodetector unit 118. The hologram 130 is composed of six divided regions 130a, 130b, 130c, 130d, 130e, and 130f. The regions 130a and 130b are used for FES beam detection, and the regions 130c to 130f are used for TES beam detection.

The four regions 130c to 130f are divided from each other by a first division line 132 passing through the center of the hologram 103 and extending parallel to the information recording direction of the optical disk, and by a second division line 134 perpendicular to the first division line 132 and passing through the center of the hologram 130. This preferred embodiment is similar to the first and second preferred embodiments in the point of focusing error detection, but different from the first and second preferred embodiments in the point that the fourth preferred embodiment employs a heterodyne method for tracking error detection like the third preferred embodiment shown in FIG. 19.

In the first to fourth preferred embodiments mentioned above, the size of each hologram is set so that the diameter of the hologram is equal to the diameter of the cross section of a reflected beam from the optical disk 62 on the surface of the hologram. Accordingly, there is a possibility of offset of a tracking error signal to be hereinafter described.

Figure 21:
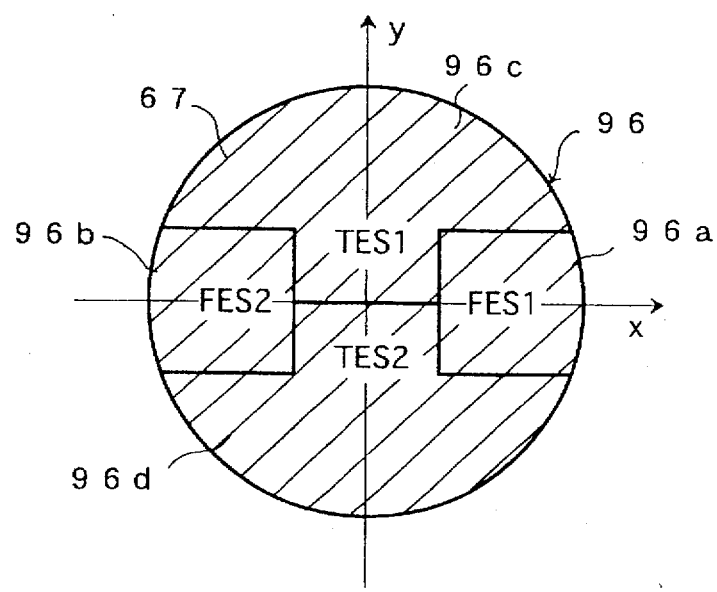
FIG. 21 is a view showing the relation between the hologram according to the second preferred embodiment and the cross section of a reflected beam on the hologram.
Figure 22A:
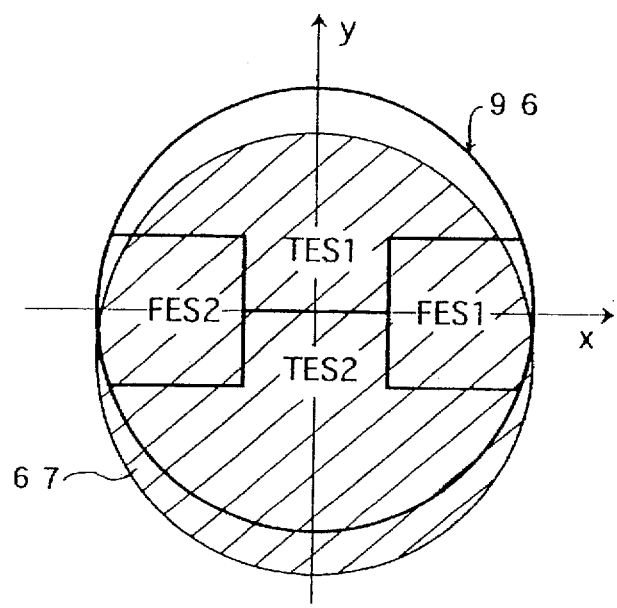
FIG. 22A is a view showing a case where the center of the hologram shown in FIG. 21 is shifted from the center of the reflected beam in a +Y direction.
Figure 22B:
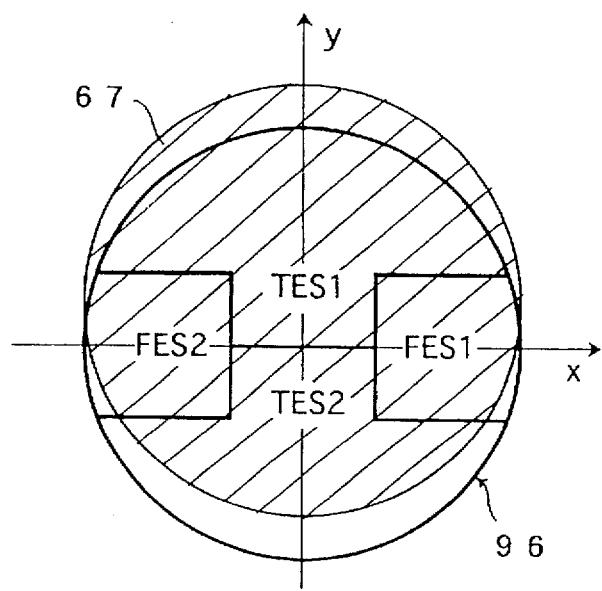
FIG. 22B is a view showing a case where the center of the hologram shown in FIG. 21 is shifted from the center of the reflected beam in a −Y direction.

Referring to FIG. 21, there is shown the relation between the hologram 96 according to the second preferred embodiment and the cross section 67 of a reflected beam on the surface of the hologram 96. In the case that there is no assembly error in the optical system, the diameter of the circular hologram 96 is substantially equal to the diameter of the cross section 67 of the reflected beam. FIG. 22A shows a positional relation between the hologram 96 and the beam cross section 67 in the case that the center of the hologram 96 is shifted from the center of the beam cross section 67 in a +Y direction because of mounting error of the hologram 96. FIG. 22B shows a positional relation between the hologram 96 and the beam cross section 67 in the case that the center of the hologram 96 is shifted from the center of the beam cross section 67 in a −Y direction.

Letting P1 and P2 denote the outputs from the photodetectors 80 and 82 shown in FIG. 10, respectively, a tracking error signal (TES) is expressed as follows:

TES=P1−P2

In the case that there is no mounting error of the hologram 96 as shown in FIG. 21, and when the beam spot focused on the optical disk 62 by the objective lens 60 lies on the center of the track on the optical disk 62, TES is approximately zero.

In the case of FIG. 22A, a light quantity in the region TES1 is reduced by eclipse, so that when the beam spot lies on the center of the track on the optical disk 62, TES is not approximately zero. When TES >0 in the case of FIG. 21, TES is approximately zero in the case of FIG. 22A. As a result, in the case of FIG. 22A, when the beam spot is shifted from the center of the track on the optical disk, a control circuit erroneously recognizes an on-track condition. Such a phenomenon is called that offset lies on a tracking error signal. A similar phenomenon occurs also in the case of FIG. 22B.

Figure 23A:
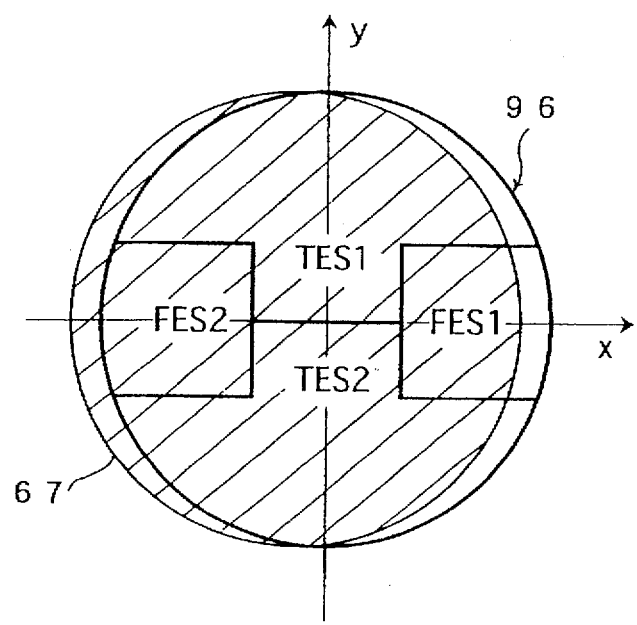
FIG. 23A is a view showing a case where the center of the hologram shown in FIG. 21 is shifted from the center of the reflected beam in a +X direction.

FIG. 23A shows a case where the center of the hologram 96 is shifted from the center of the beam cross section 67 in a +X direction, and FIG. 22B shows a case where the center of the hologram 96 is shifted from the center of the beam cross section 67 in a −X direction. In both cases of FIGS. 23A and 23B, eclipse occurs equally in both the region TES1 and the region TES2, so that no offset lies on a tracking error signal in these cases.

Figure 23B:
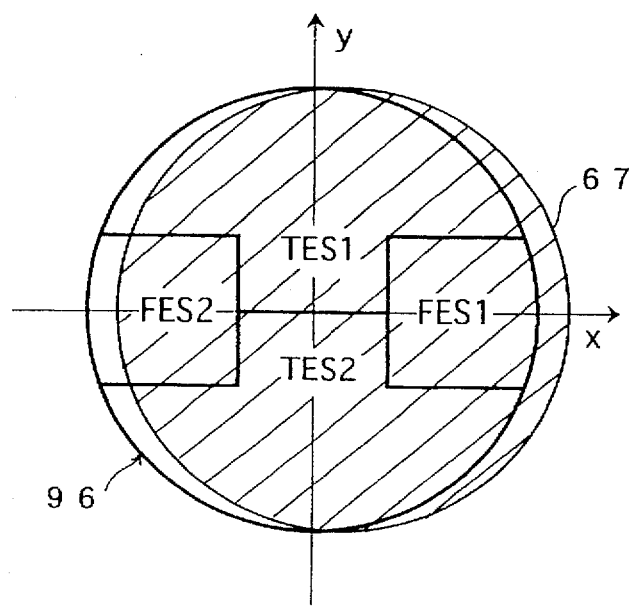
FIG. 23B is a view showing a case where the center of the hologram shown in FIG. 21 is shifted from the center of the reflected beam in a −X direction.

In each of the cases of FIGS. 23A and 23B, there is a difference in incident light quantity between the region FES1 and the region FES2 for focusing error detection. However, focusing error detection by a double knife-edge method employs the shapes of diffracted beams rather than the light quantities of diffracted beams. Therefore, there is little influence due to the difference in incident light quantity between the regions FES1 and FES2.

As apparent from the above description, in the case that the hologram is mounted to the optical system with the center of the hologram being shifted in the Y direction (+Y direction or −Y direction), offset of a tracking error signal undesirably occurs. While such offset of a tracking error signal does not occur in a heterodyne method, this method cannot be adopted for tracking error detection of a magneto-optical disk. Accordingly, it is necessary to provide an error detection optical device for an optical disk drive which can eliminate offset of a tracking error signal even when mounting error occurs in mounting a hologram to an optical system.

Figure 24:
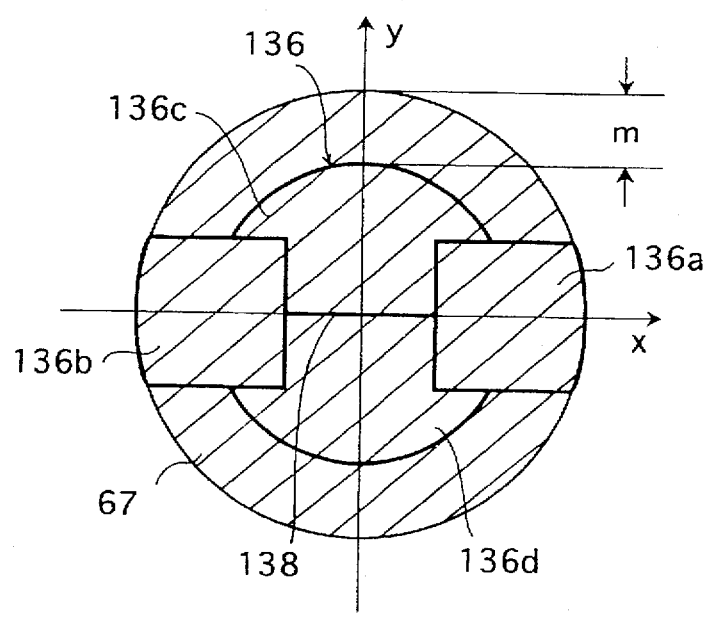
FIG. 24 is a view showing a hologram according to a fifth preferred embodiment of the present invention in relation to the cross section of a reflected beam on the hologram.

Referring to FIG. 24, there is shown a hologram 136 as a diffraction grating according to a fifth preferred embodiment of the present invention which can eliminate offset of a tracking error signal. In FIG. 24, reference numeral 67 denotes the cross section of a reflected beam incident on the surface of the hologram 136. The hologram 136 is composed of two regions 136a and 136b for FES beam detection and two regions 136c and 136d for TES beam detection. The regions 136a and 136b for FES beam detection are the same in shape and size as the regions 96a and 96b in the second preferred embodiment shown in FIG. 15.

Figure 25A:
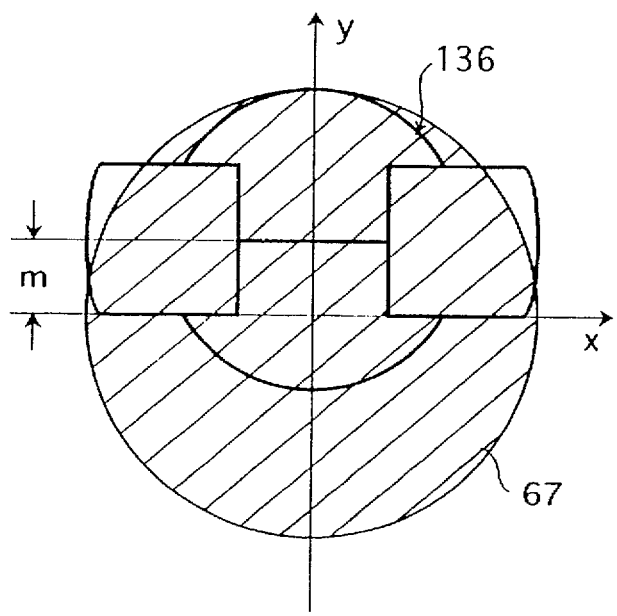
FIG. 25A is a view showing a case where the center of the hologram shown in FIG. 24 is shifted from the center of the reflected beam in a +Y direction.

The regions 136c and 136d for TES beam detection are divided from each other by a division line 138 passing through the center of the hologram 136 and extending parallel to the information recording direction of the optical disk. Each of the regions 136c and 136d has an outer circumference formed by an arc having a radius smaller by m than the radius of the beam cross section 67. As mentioned above, in the case that the hologram 136 is mounted to an optical system with mounting error in the Y direction, offset lies on a tracking error signal. FIG. 25A shows a positional relation between the beam cross section 67 and the hologram 136 in the case that the center of the hologram 136 is shifted by m in the +Y direction, and FIG. 25B shows a positional relation between the beam cross section 67 and the hologram 136 in the case that the center of the hologram 136 is shifted by m in the −Y direction.

Figure 25B:
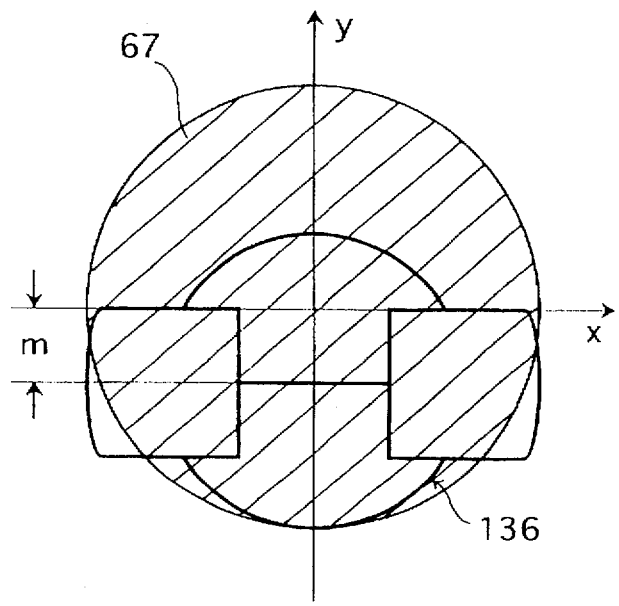
FIG. 25B is a view showing a case where the center of the hologram shown in FIG. 24 is shifted from the center of the reflected beam in a −Y direction.

As apparent from FIGS. 25A and 25B, even when the hologram 136 is mounted to the optical system with an error of ±m in the Y direction, no eclipse occurs. Since no eclipse occurs, there is no possibility that offset may lie on a tracking error signal. Accordingly, even though the mounting error m is present, no offset lies on a tracking error signal. This error m is called an offset margin.

Figure 26:
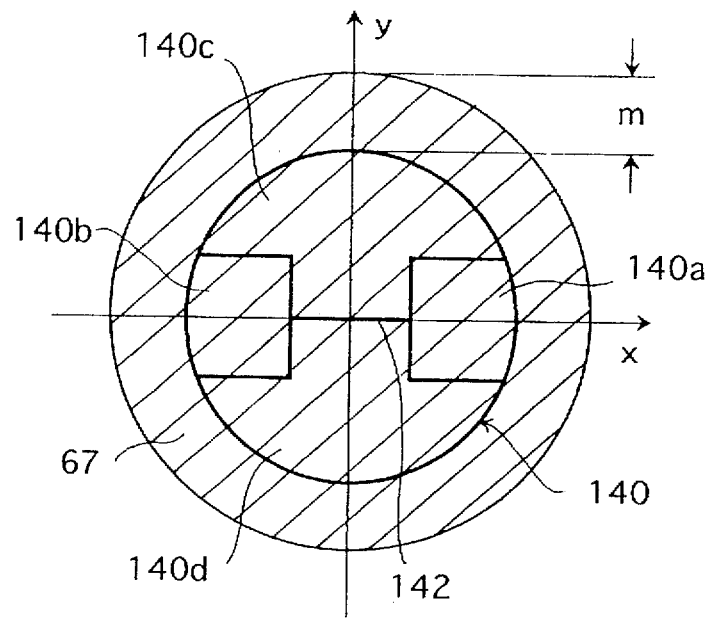
FIG. 26 is a view showing a hologram according to a sixth preferred embodiment of the present invention in relation to the cross section of a reflected beam on the hologram.

FIG. 26 shows a positional relation between a hologram 140 as a diffraction grating according to a sixth preferred embodiment of the present invention and the reflected beam cross section 67. The hologram 140 is similar to the hologram 96 according to the second preferred embodiment shown in FIG. 15; however, the hologram 140 has an outer circumference formed by a circle having a radius smaller by m than the radius of the circular hologram 96 shown in FIG. 15. The circular hologram 140 is composed of two regions 140a and 140b for FES beam detection and two regions 140c and 140d for TES beam detection. The regions 140c and 140d are divided from each other by a division line 142 passing through the center of the hologram 140 and extending parallel to the information recording direction of the optical disk.

Figure 27:
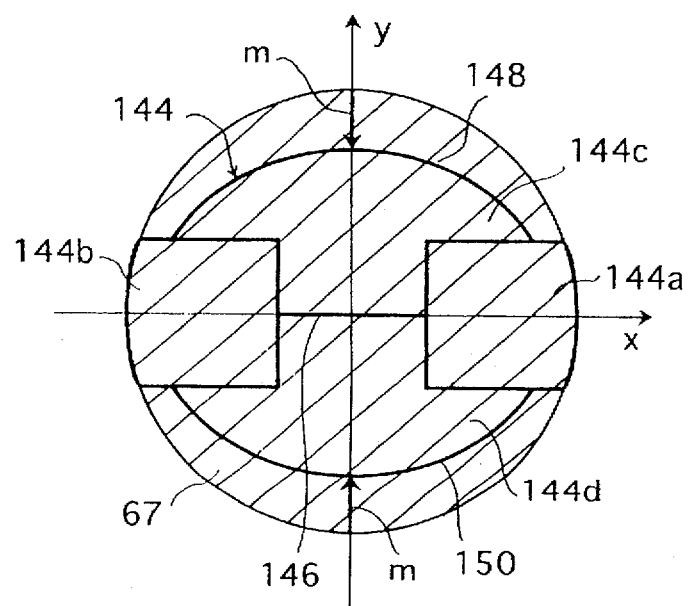
FIG. 27 is a view showing a hologram according to a seventh preferred embodiment of the present invention in relation to the cross section of a reflected beam on the hologram.

FIG. 27 shows a positional relation between a hologram 144 as a diffraction grating according to a seventh preferred embodiment of the present invention and the cross section 67 of a reflected beam incident on the surface of the hologram 144. The hologram 144 is composed of two FES regions 144a and 144b and two TES regions 144c and 144d. The FES regions 144a and 144b are the same in shape and size as the FES regions 96a and 96b according to the second preferred embodiment shown in FIG. 15. The TES regions 144c and 144d are divided from each other by a division line 146 passing through the center of the hologram 144 and extending parallel to the information recording direction of the optical disk.

The TES region 144c has an outer circumference formed by an arc 148 obtained by parallel moving an arc forming the outer circumference of the TES region 96c of the circular hologram 96 shown in FIG. 15, by an amount m in the −Y direction. Similarly, the TES region 144d has an outer circumference formed by an arc 150 obtained by parallel moving an arc forming the outer circumference of the TES region 96d of the circular hologram 96, by the amount m in the +Y direction.

Figure 28A:
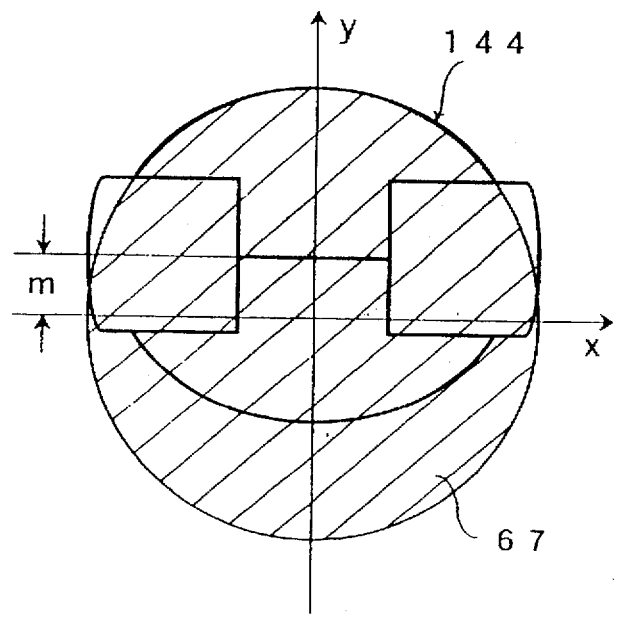
FIG. 28A is a view showing a case where the center of the hologram shown in FIG. 27 is shifted from the center of the reflected beam in a +Y direction.
Figure 28B:
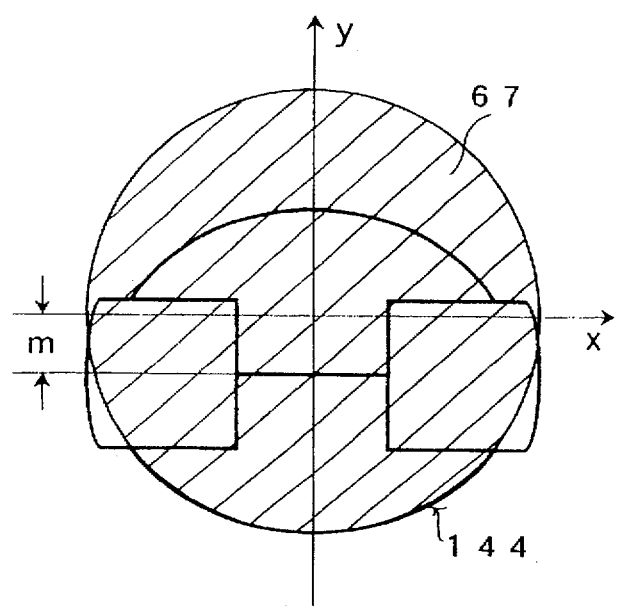
FIG. 28B is a view showing a case where the center of the hologram shown in FIG. 27 is shifted from the center of the reflected beam in a −Y direction.

By using the hologram 144, no eclipse occurs even when the center of the hologram 144 is shifted by the upper limit m in the +Y direction in mounting the hologram 144 to the optical system as shown in FIG. 28A, thereby eliminating offset of a tracking error signal. Similarly, even when the center of the hologram 144 is shifted by the upper limit m in the −Y direction as shown in FIG. 28B, no eclipse occurs, thereby eliminating offset of a tracking error signal.

Figure 29:
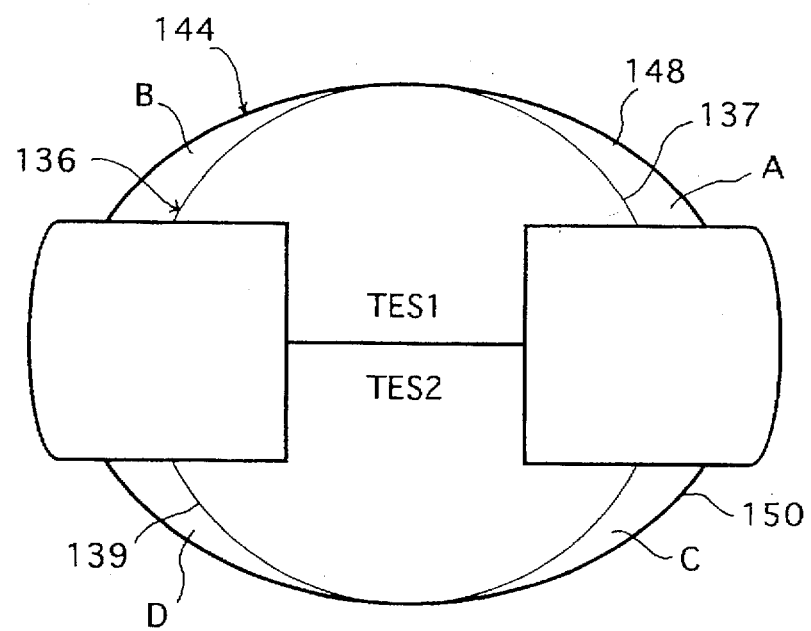
FIG. 29 is a view showing a condition where the hologram according to the fifth preferred embodiment and the hologram according to the seventh preferred embodiment are superimposed.

FIG. 29 shows a condition where the hologram 136 according to the fifth preferred embodiment and the hologram 144 according to the seventh preferred embodiment are superimposed. In FIG. 29, reference numerals 137 and 139 denote the outer circumferences of the regions TES1 and TES2 of the hologram 136, respectively; and reference numerals 148 and 150 denote the outer circumferences of the regions TES1 and TES2 of the hologram 144, respectively. Reference characters A and B denote regions defined by the outer circumferences 137 and 148, and reference characters C and D denote regions defined by the outer circumferences 139 and 150. It is understood from FIG. 29 that the hologram 144 according to the seventh preferred embodiment can increase a light quantity over the hologram 136 according to the fifth preferred embodiment by an amount corresponding to A+B in the region TES1 and an amount corresponding to C+D in the region TES2, provided that the offset margin m is the same.

Each hologram according to the fifth to seventh preferred embodiments mentioned above has the following problem.

That is, when the laser beam emitted from the semiconductor laser generator 50 is passed through the hologram, the light quantity of a zero-order beam from the hologram or transmitted light quantity is reduced by the influence of the hologram. However, the light quantity of a zero-order beam passed outside of the hologram is not reduced. As a result, there occurs variations in distribution of the light quantities of the zero-order beams.

Figure 30A:
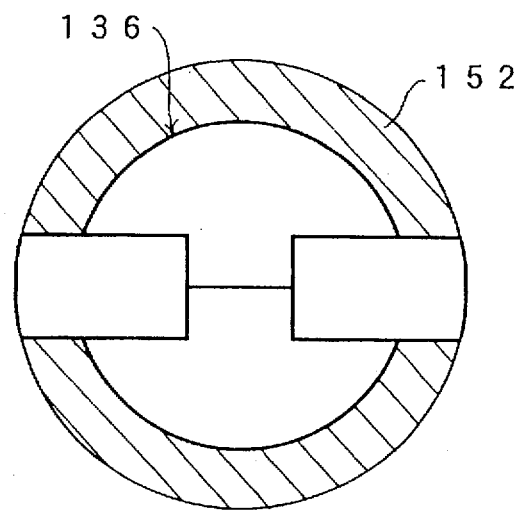
FIG. 30A is a view showing a modification of the hologram according to the fifth preferred embodiment.
Figure 30B:
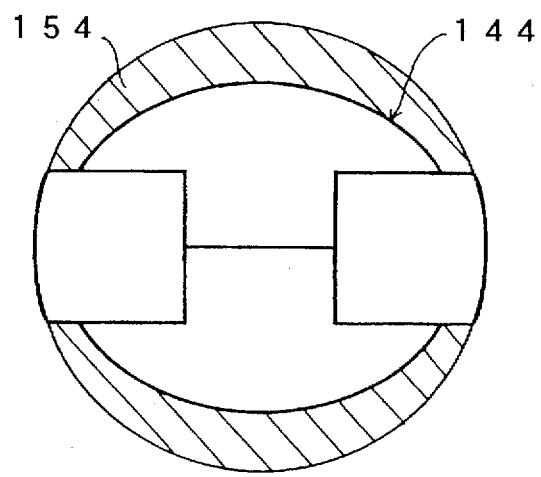
FIG. 30B is a view showing a modification of the hologram according to the seventh preferred embodiment.

FIGS. 30A and 30B show modifications to prevent this problem. Dummy holograms 152 and 154 are located around the holograms 136 and 144, respectively. The dummy hologram 152 has a spatial frequency equal to that of the hologram 136, and diffracts light in a direction quite different from the diffraction directions of the hologram 136. Similarly, the dummy hologram 154 has a spatial frequency equal to that of the hologram 144, and diffracts light in a direction quite different from the diffraction directions of the hologram 144. Accordingly, variations in distribution of the light quantities of the zero-order laser beam can be suppressed.

Figure 31:
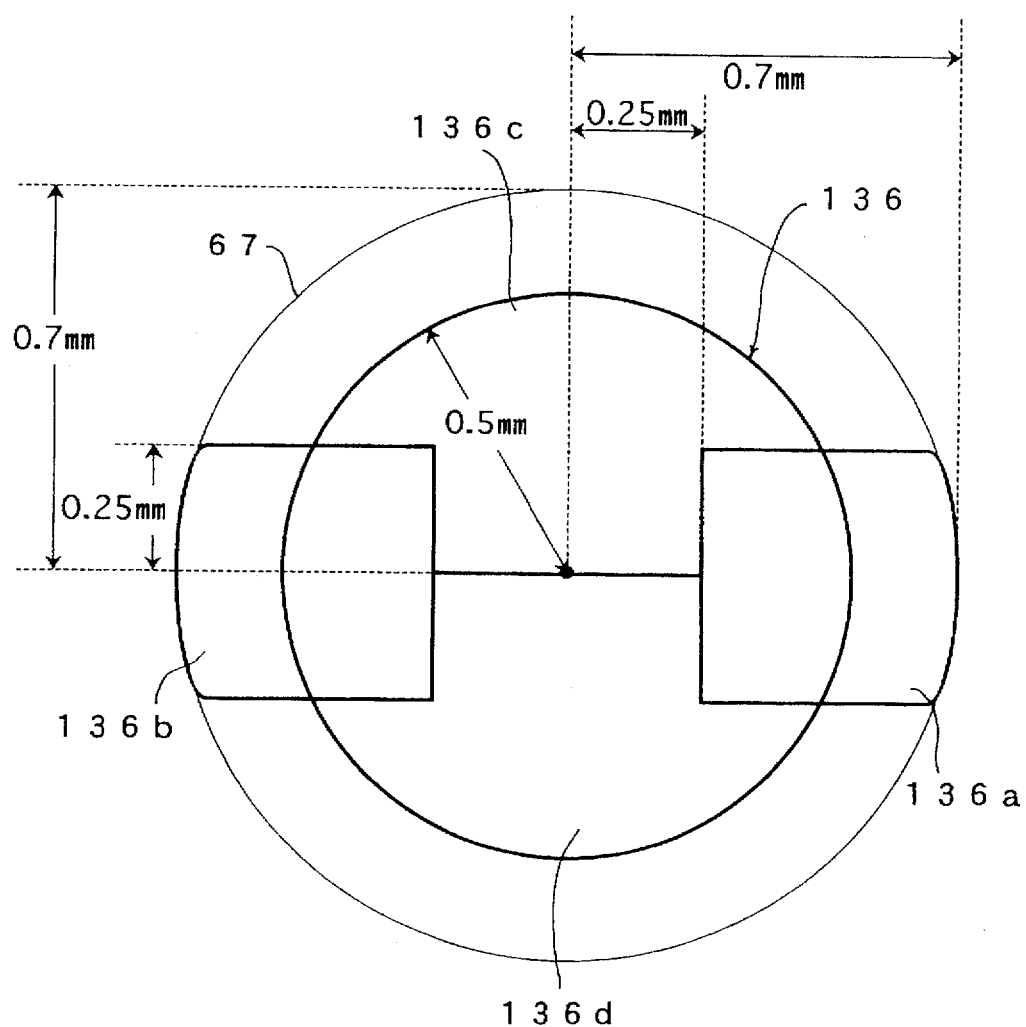
FIG. 31 is a view showing an example of dimensions of the hologram according to the fifth preferred embodiment.
Figure 32:
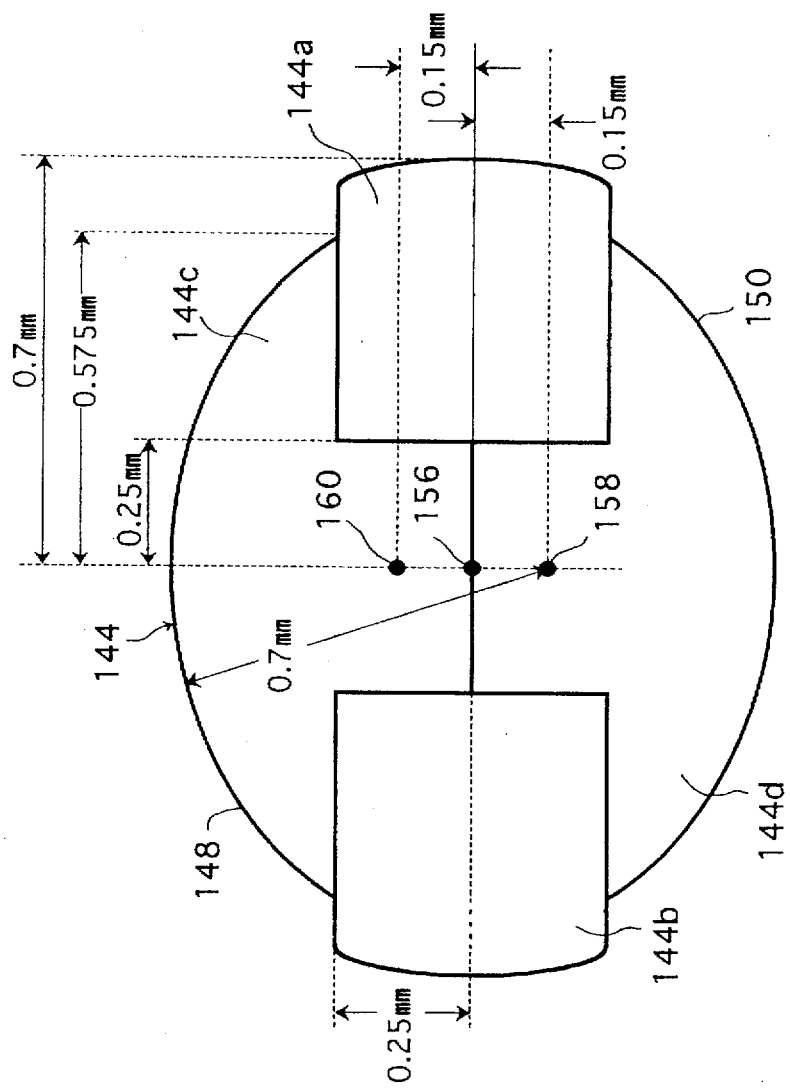
FIG. 32 is a view showing an example of dimensions of the hologram according to the seventh preferred embodiment.

Referring to FIG. 31, there is shown an example of dimensions of the hologram 136 according to the fifth preferred embodiment in relation to the cross section 67 of a reflected beam on the surface of the hologram 136. Referring to FIG. 32, there is shown an example of dimensions of the hologram 144 according to the seventh preferred embodiment. The outer circumference 148 of the TES region 144c coincides with an arc formed about a point 158 offset by m in the −Y direction from the center 156 of the hologram 144. Similarly, the outer circumference 150 of the TES region 144d coincides with an arc formed about a point 160 offset by m in the +Y direction from the center 156 of the hologram 144.

Figure 33:
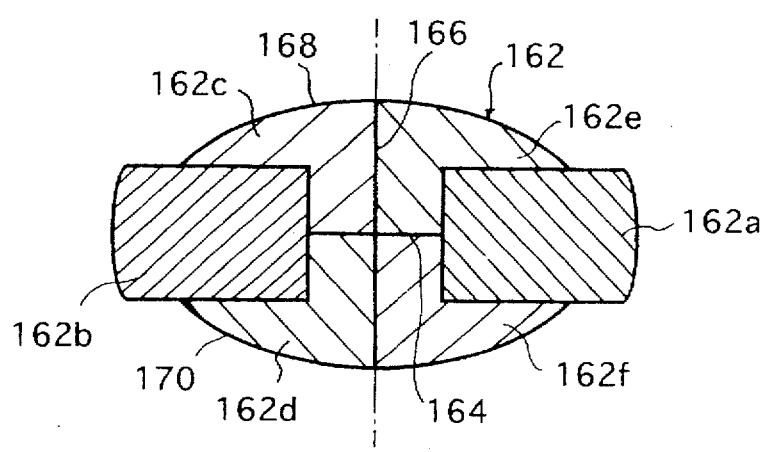
FIG. 33 is a view showing a distribution of interference fringes of a hologram according to an eighth preferred embodiment of the present invention.

Referring to FIG. 33, there is shown a hologram 162 as a diffraction grating according to an eighth preferred embodiment of the present invention. Like the fourth preferred embodiment shown in FIG. 20, the hologram 162 according to the eighth preferred embodiment employs a heterodyne method for tracking error detection. The hologram 162 is composed of six divided regions 162a, 162b, 162c, 162d, 162e, and 162f. The regions 162a and 162b are used for FES beam detection, and the regions 162c to 162f are used for TES beam detection.

The FES regions 162a and 162b are the same in size and shape as the FES regions 130a and 130b of the hologram 130 according to the fourth preferred embodiment shown in FIG. 20. The TES regions 162c to 162f are divided from each other by a first division line 164 passing through the center of the hologram 162 and extending parallel to the information recording direction of the optical disk, and by a second division line 166 perpendicular to the first division line 164 and passing through the center of the hologram 162.

Each of the TES regions 162c and 162e has an outer circumference formed by an arc 168 about a point offset by m in the −Y direction from the center of the circular hologram 130 shown in FIG. 20. Similarly, each of the TES regions 162d and 162f has an outer circumference formed by an arc 170 about a point offset by m in the +Y direction from the center of the circular hologram 130. By using the hologram 162, the occurrence of offset of a tracking error signal in using a heterodyne method for tracking error detection can be prevented.

As described above, according to the present invention, the shapes of beam spots to be converged on the photodetectors for focusing error detection can be controlled by using a diffraction grating, thereby increasing the quantities of light incident on the photodetectors. Accordingly, it is possible to provide an error detection optical device for an optical disk drive which can perform accurate detection of focusing error.

According to a preferred embodiment of the present invention, it is possible to provide an error detection optical device for an optical disk drive which can eliminate offset of a tracking error signal even when there is a mounting error in mounting a hologram to an optical system.

What is claimed is:

1. An optical device for an optical disk drive, for performing focusing error detection and tracking error detection of a laser beam converged on an optical disk, comprising:

a diffraction grating having first, second, third, and fourth regions for diffracting a reflected beam from said optical disk in different directions;

a first photodetector having a first separation line, for detecting a part of said reflected beam diffracted by said first region of said diffraction grating;

a second photodetector having a second separation line, for detecting a part of said reflected beam diffracted by said second region of said diffraction grating;

a third photodetector for detecting a part of said reflected beam diffracted by said third region of said diffraction grating; and a fourth photodetector detector for detecting a part of said reflected beam diffracted by said fourth region of said diffraction grating;

said third and fourth regions being divided from each other by a division line extending parallel to an information recording direction of said optical disk and being symmetrical with respect to said division line;

said first and second regions being spaced apart from each other and located in symmetry with respect to a reference line perpendicularly intersecting said division line, each of said first and second regions lying on said division line so that halves are symmetrical with respect to said division line;

each of said first and second regions having two sides defined by first and second straight lines spaced from each other in parallel to and on opposite sides of said division line and a third side defined by a third straight line parallel to said reference line, the third side of said first region being opposed to the third side of said second region on opposite sides of said reference line.

2. An optical device for an optical disk drive according to claim 1, wherein said diffraction grating comprises a circular hologram.

3. An optical device for an optical disk drive according to claim 1, wherein a length of a beam spot projected on each of said first and second photodetectors in a direction perpendicular to said first and second separation lines is defined by a length of each of said first and second straight lines.

4. An optical device for an optical disk drive according to claim 3, wherein a light quantity of said part of said reflected beam incident on each of said first and second photodetectors is defined by a length of said third straight line.

5. An optical device for an optical disk drive according to claim 1, wherein:

said first region has an area substantially equal to that of said second region;

said third region has an area substantially equal to that of said fourth region; and said area of each of said third and fourth regions is larger than said area of each of said first and second regions.

6. An optical device for an optical disk drive according to claim 1, wherein each of said first and second regions further includes a fourth side defined by a fourth straight line spaced from said third straight line in parallel to said reference line.

7. An optical device for an optical disk drive according to claim 1, wherein each of said first and second regions further includes a fourth side defined by an arc spaced from said third straight line.

8. An optical device for an optical disk drive according to claim 7, wherein said diffraction grating comprises a circular hologram, and said arc coincides with a part of an outer circumference of said circular hologram.

9. An optical device for an optical disk drive according to claim 1, wherein a length of said diffraction grating in a direction of said reference line is smaller than a diameter of said reflected beam from said optical disk on an incident surface of said diffraction grating.

10. An optical device for an optical disk drive according to claim 1, wherein said diffraction grating further has a fifth region for diffracting a part of said reflected beam in a direction different from said diffraction directions of said first to fourth regions, said fifth region having a spatial frequency substantially equal to spatial frequencies of said first to fourth regions.

11. An optical device for an optical disk drive according to claim 7, wherein:

said arc coincides with a part of a circle formed about an intersection between said division line and said reference line;

said third region is defined by a first arc obtained by parallel moving said circle along said reference line toward said fourth region by a given amount;

said fourth region is defined by a second arc obtained by parallel moving said circle along said reference line toward said third region by said given amount; and said circle has a diameter substantially equal to a diameter of said reflected beam from said optical disk on an incident surface of said diffraction grating.

12. An optical device for an optical disk drive according to claim 11, wherein said diffraction grating further has a fifth region for diffracting a part of said reflected beam in a direction different from said diffraction directions of said first to fourth regions, said fifth region having a spatial frequency substantially equal to spatial frequencies of said first to fourth regions.

13. An optical device for an optical disk drive, for performing focusing error detection and tracking error detection of a laser beam converged on an optical disk, comprising:

a diffraction grating having first, second, third, fourth, fifth and sixth regions for diffracting a reflected beam from said optical disk in different directions;

a first photodetector having a first separation line, for detecting a part of said reflected beam diffracted by said first region of said diffraction grating;

a second photodetector having a second separation line, for detecting a part of said reflected beam diffracted by said second region of said diffraction grating;

a third photodetector for detecting a part of said reflected beam diffracted by said third region of said diffraction grating;

a fourth photodetector detector for detecting a part of said reflected beam diffracted by said fourth region of said diffraction grating;

a fifth photodetector for detecting a part of said reflected beam diffracted by said fifth region of said diffraction grating; and a sixth photodetector for detecting a part of said reflected beam diffracted by said sixth region of said diffraction grating;

said third, fourth, fifth, and sixth regions being divided from each other by a division line extending parallel to an information recording direction of said optical disk and by a second division line perpendicularly intersecting said first division line;

said first and second regions being located in symmetry with respect to said second division line and spaced apart from said second division line;

each of said first and second regions having two sides defined by first and second straight lines spaced from each other in parallel to and on opposite sides of said first division line and a third side defined by a third straight line parallel to said second division line, the third side of said first region being opposed to the third side of said second region on opposite sides of said second division line.

14. An optical device for an optical disk drive according to claim 13, wherein said diffraction grating comprises a circular hologram.

15. An optical device for an optical disk drive according to claim 13, wherein a length of a beam spot projected on each of said first and second photodetectors in a direction perpendicular to said first and second separation lines is defined by a length of each of said first and second straight lines.

16. An optical device for an optical disk drive according to claim 15, wherein a light quantity of said part of said reflected beam incident on each of said first and second photodetectors is defined by a length of said third straight line.

17. An optical device for an optical disk drive according to claim 13, wherein:

said first region has an area substantially equal to that of said second region;

said third to sixth regions have areas substantially equal to each other; and said area of each of said third to sixth regions is larger than said area of each of said first and second regions.

18. An optical device for an optical disk drive according to claim 13, wherein a length of said diffraction grating in a direction of said second division line is smaller than a diameter of said reflected beam from said optical disk on an incident surface of said diffraction grating.

19. An optical device for an optical disk drive according to claim 18, wherein said diffraction grating further has a seventh region for diffracting a part of said reflected beam in a direction different from said diffraction directions of said first to sixth regions, said seventh region having a spatial frequency substantially equal to spatial frequencies of said first to sixth regions.

20. An optical device for an optical disk drive according to claim 13, wherein each of said first and second regions further includes a fourth side defined by a fourth straight line spaced from said third straight line in parallel to said second division line.

21. An optical device for an optical disk drive according to claim 13, wherein each of said first and second regions further includes a fourth side defined by an arc spaced from said third straight line.

22. An optical device for an optical disk drive according to claim 21, wherein said diffraction grating comprises a circular hologram, and said arc coincides with a part of an outer circumference of said circular hologram.

23. An optical device for an optical disk drive according to claim 21, wherein:
   said arc coincides with a part of a circle formed about an intersection between said first division line and said second division line;
   said third and fourth regions are defined by a first arc obtained by parallel moving said circle along said second division line toward said fifth and sixth regions by a given amount;
   said fifth and sixth regions are defined by a second arc obtained by parallel moving said circle along said second division line toward said third and fourth regions by said given amount; and
   said circle has a diameter substantially equal to a diameter of said reflected beam from said optical disk on an incident surface of said diffraction grating.

* * * * *